United States Patent [19]
LeBlanc et al.

[11] Patent Number: 5,768,686
[45] Date of Patent: Jun. 16, 1998

[54] METHOD AND SYSTEM FOR POSITION DETERMINATION USING VIDEO DIAL TONE

[75] Inventors: Frederick W. LeBlanc, Arvada; Christopher S. Rohrer, Boulder, both of Colo.

[73] Assignee: U S West, Inc., Englewood, Colo.

[21] Appl. No.: 616,229

[22] Filed: Mar. 15, 1996

Related U.S. Application Data

[63] Continuation-in-part of Ser. No. 314,477, Sep. 28, 1994, Pat. No. 5,602,903.
[51] Int. Cl.$^6$ .................................................. H04Q 7/06
[52] U.S. Cl. ........................................ 455/31.1; 455/456
[58] Field of Search ................................ 455/456, 422, 455/31.1; 340/825.44

[56] References Cited

U.S. PATENT DOCUMENTS

| | | |
|---|---|---|
| 3,889,264 | 6/1975 | Fletcher . |
| 4,054,880 | 10/1977 | Dalabakis et al. . |
| 4,799,062 | 1/1989 | Sanderford, Jr. et al. . |
| 4,833,480 | 5/1989 | Palmer et al. . |
| 4,876,738 | 10/1989 | Selby . |
| 4,888,595 | 12/1989 | Friedman . |
| 4,891,650 | 1/1990 | Sheffer . |
| 5,043,736 | 8/1991 | Darnell et al. . |
| 5,055,851 | 10/1991 | Sheffer . |
| 5,097,499 | 3/1992 | Cosentino . |
| 5,103,459 | 4/1992 | Gilhousen et al. . |
| 5,173,710 | 12/1992 | Kelley et al. . |
| 5,179,721 | 1/1993 | Comroe et al. . |
| 5,208,756 | 5/1993 | Song . |
| 5,216,429 | 6/1993 | Nakagawa et al. . |
| 5,218,367 | 6/1993 | Sheffer et al. . |
| 5,219,629 | 6/1993 | Dumond, Jr. et al. . |
| 5,221,925 | 6/1993 | Cross . |
| 5,223,844 | 6/1993 | Mansell et al. . |
| 5,280,295 | 1/1994 | Kelley et al. . |
| 5,602,903 | 2/1997 | LeBlanc et al. . |

*Primary Examiner*—William Cumming
*Attorney, Agent, or Firm*—Brooks & Kushman P.C.

[57] ABSTRACT

A method for determining and reporting the position of a mobile unit to a third party via a video dial tone (VDT) network is described. The method is directed for use in a wireless communication system having at least one registration area including at least one control unit and at least one base station having a corresponding coverage area. For each of the base stations in a registration area, a plurality of analog and/or TDMA RF measurements are determined, including its link budget, for a predetermined plurality of distances and directions. These measurements are modeled as scaled contoured shapes having minimum and maximum boundaries which are used to define a bounding polygon area to describe the position of a mobile station in terms of minimum and maximum error estimate. The video dial tone network includes an interactive video delivery system, a set top terminal and a video monitor.

5 Claims, 18 Drawing Sheets

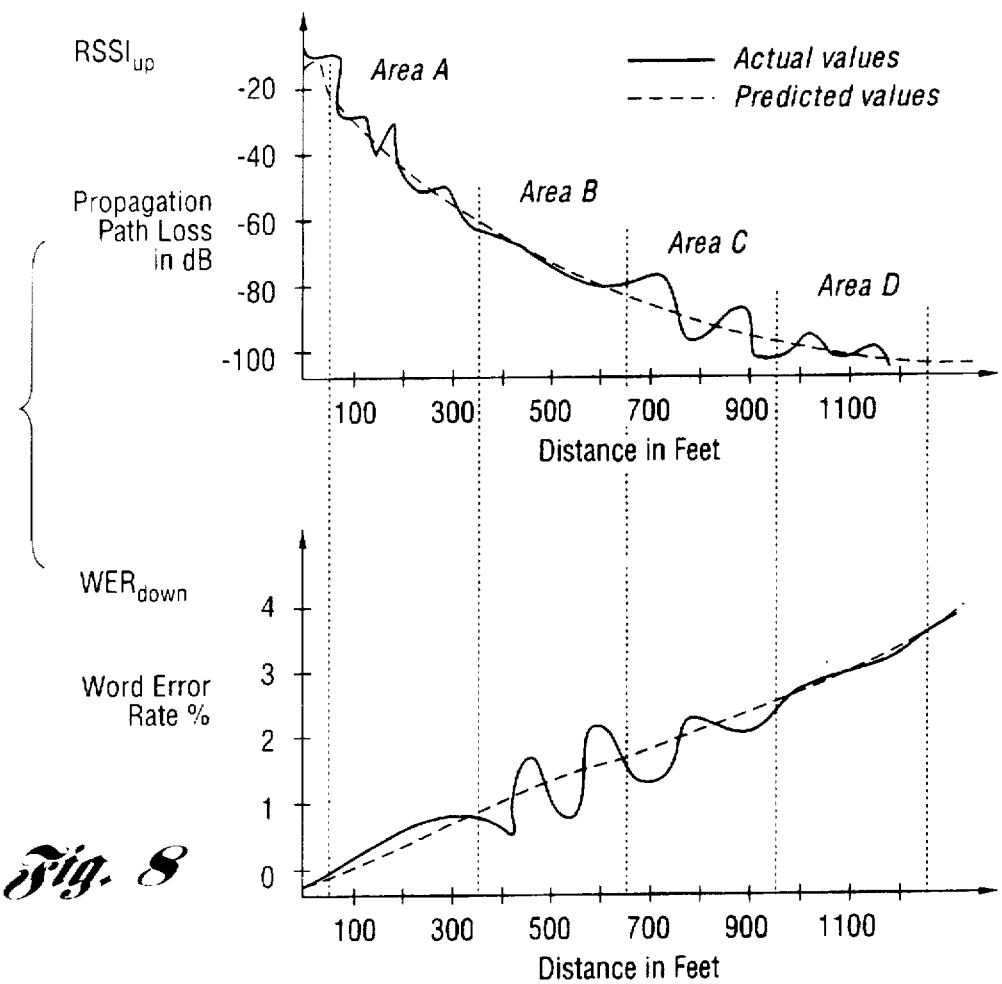
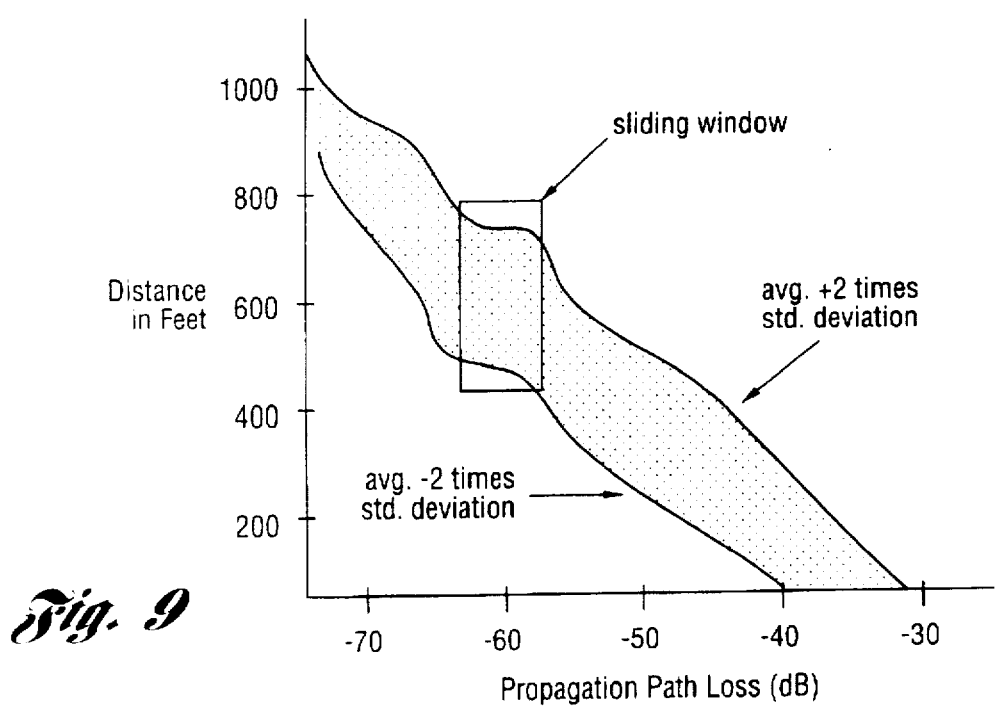
Fig. 8
Fig. 9

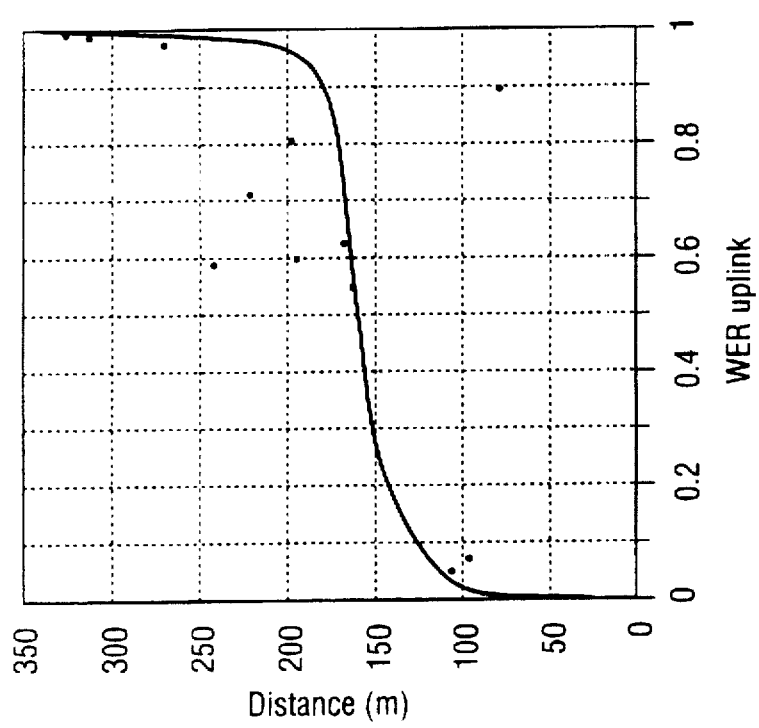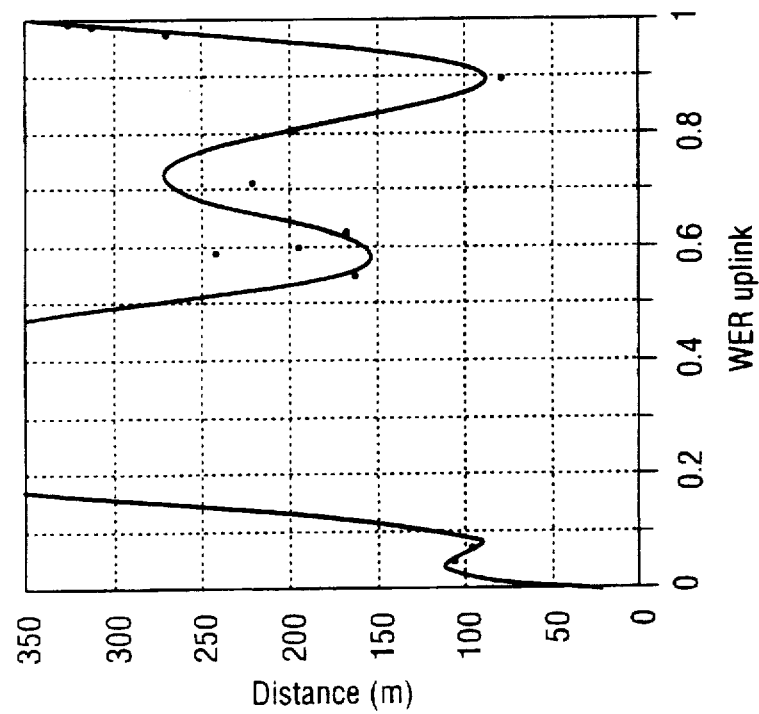
Fig. 12

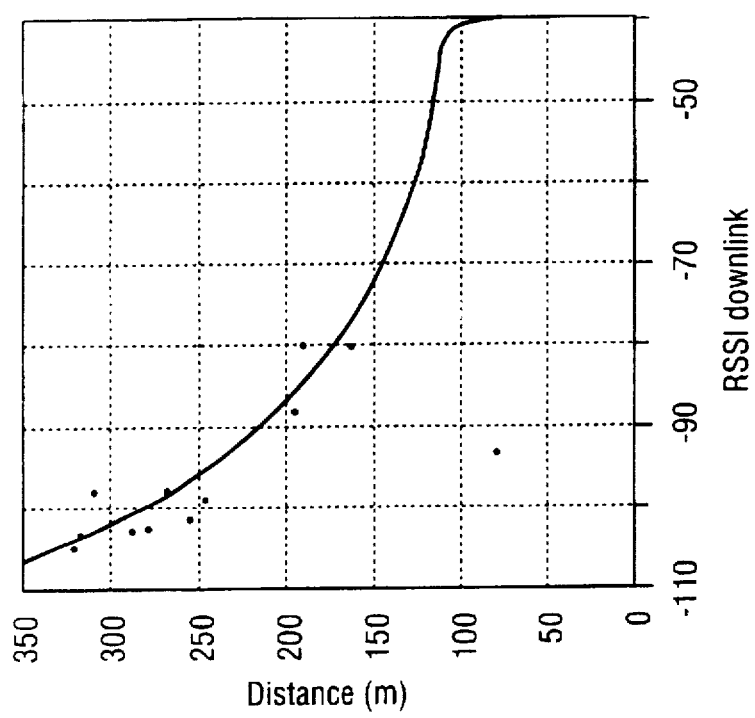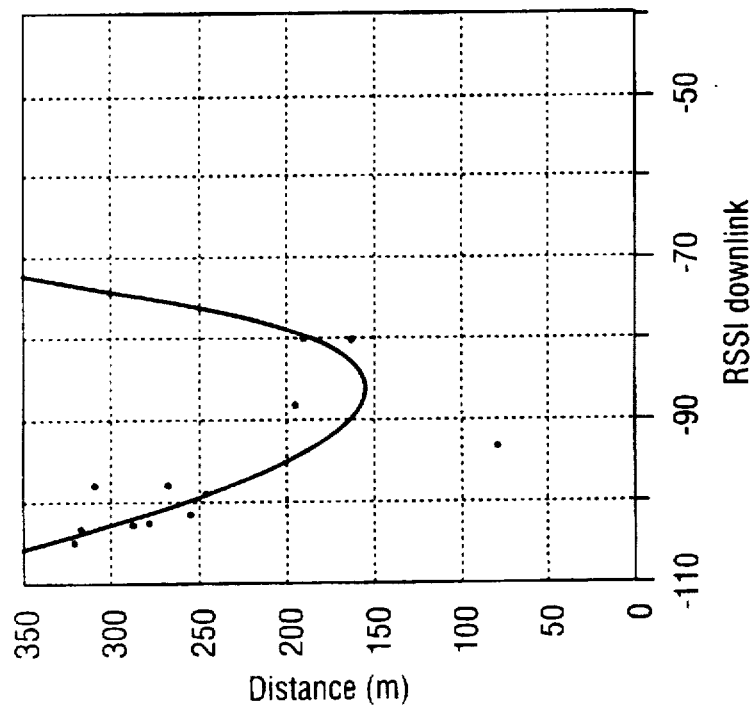
Fig. 13

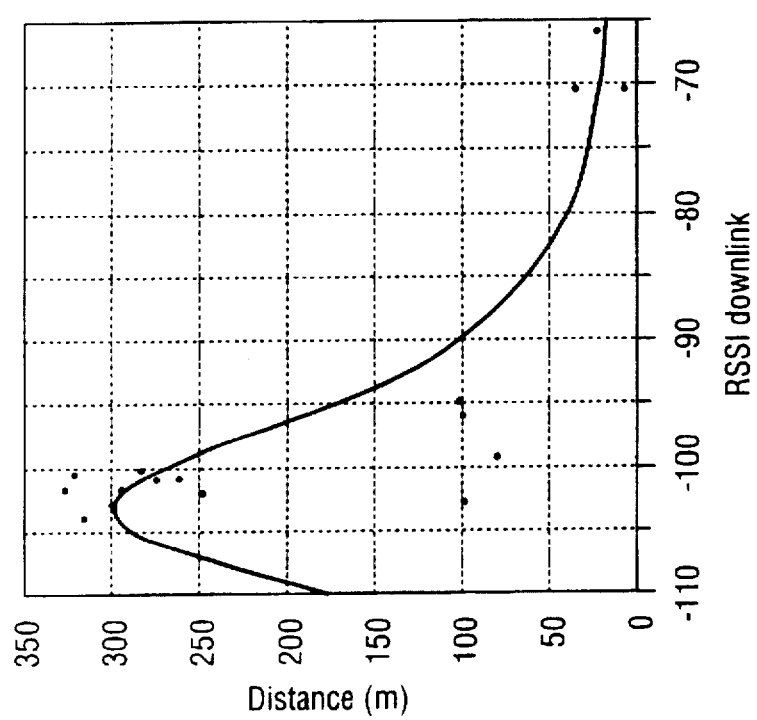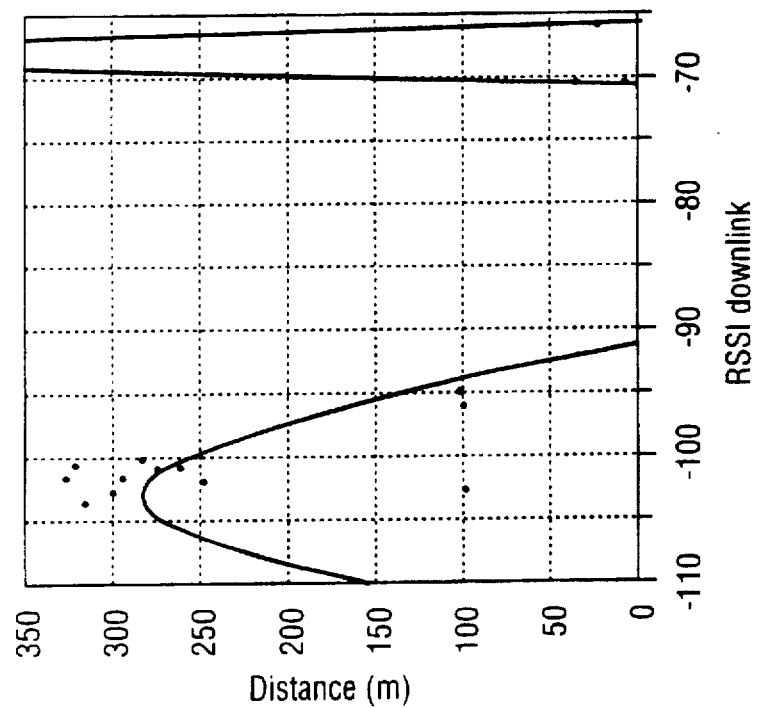
Fig. 14

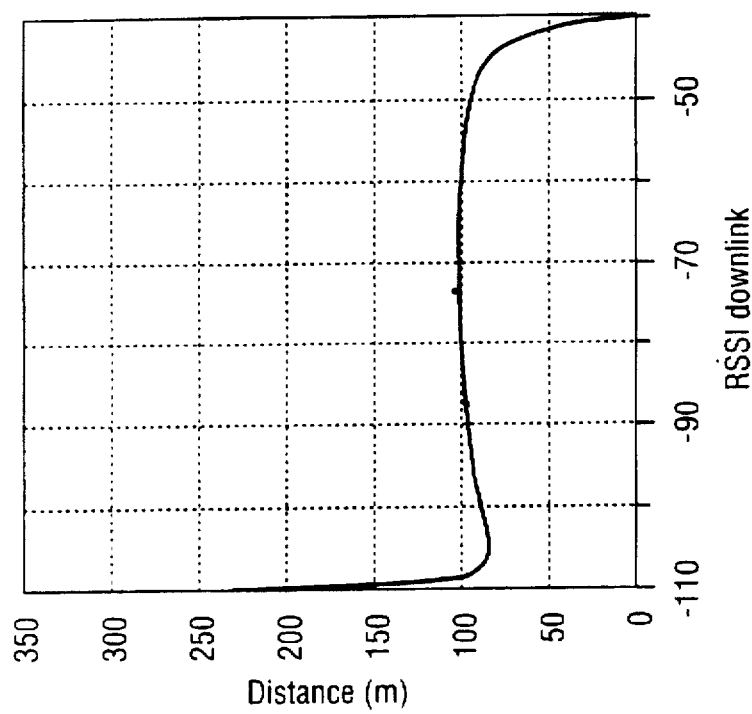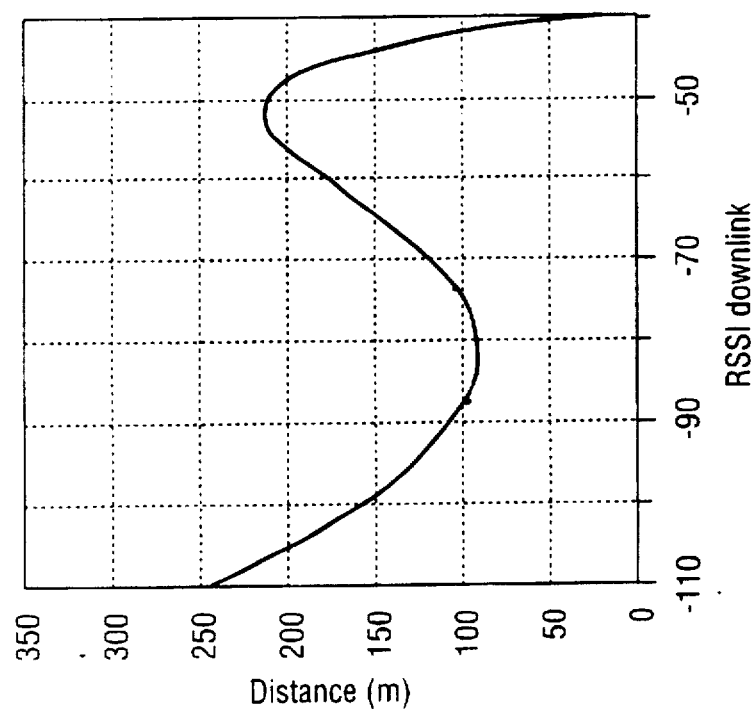
Fig. 15

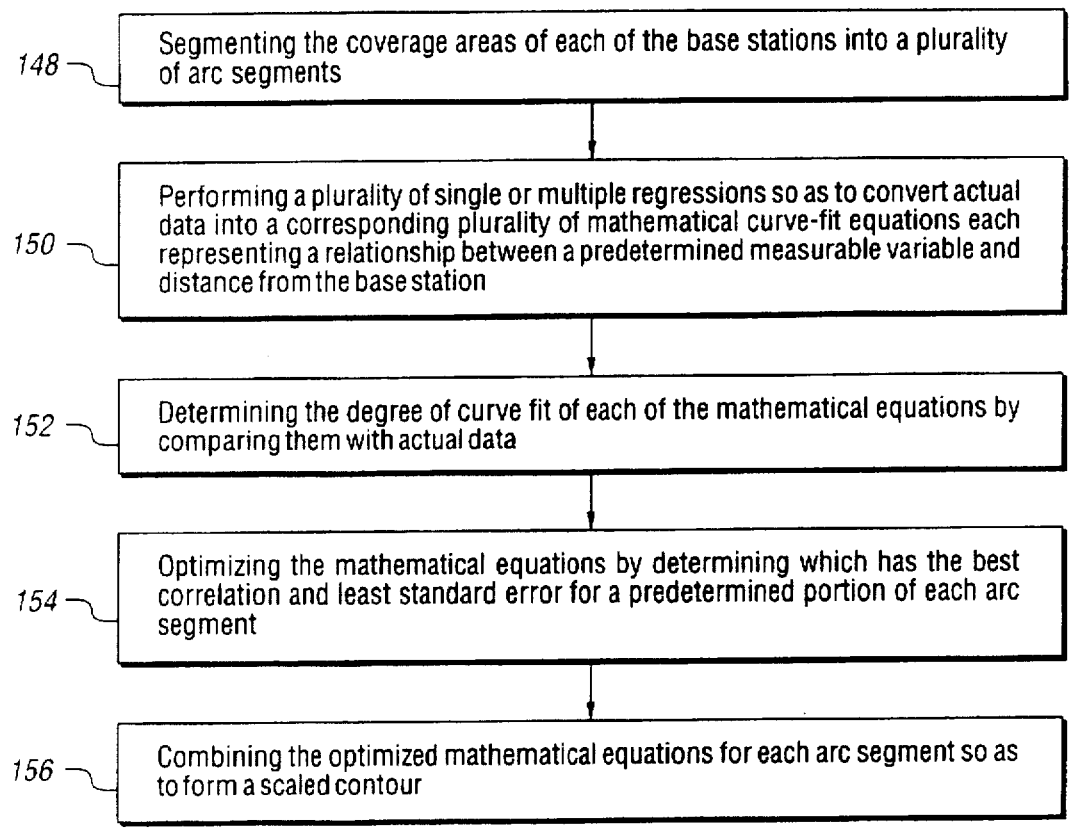
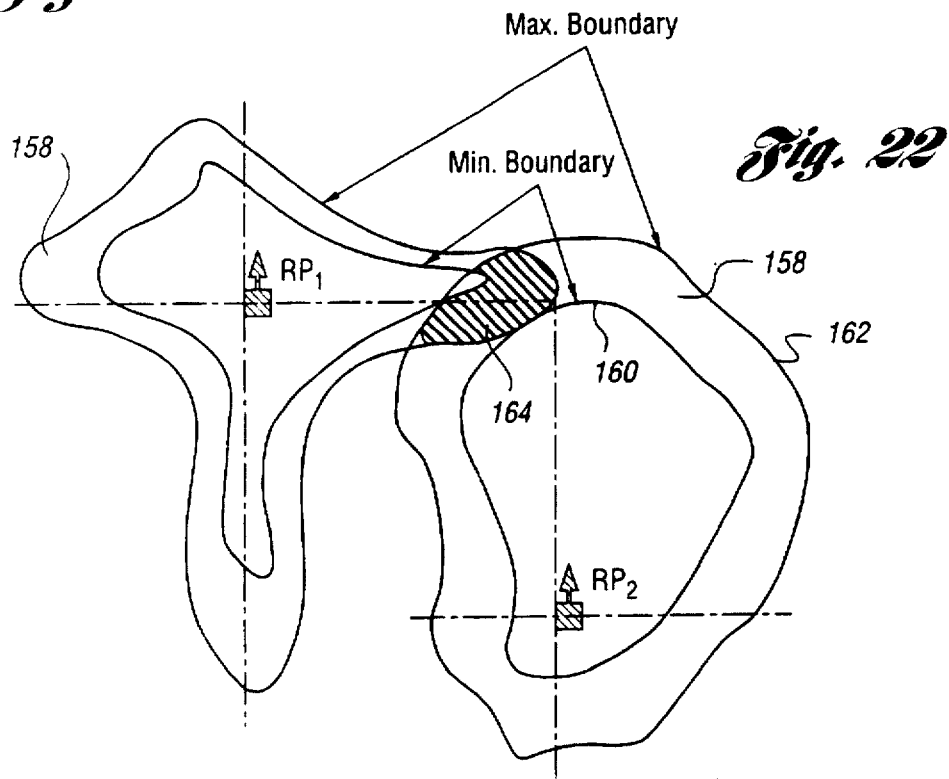

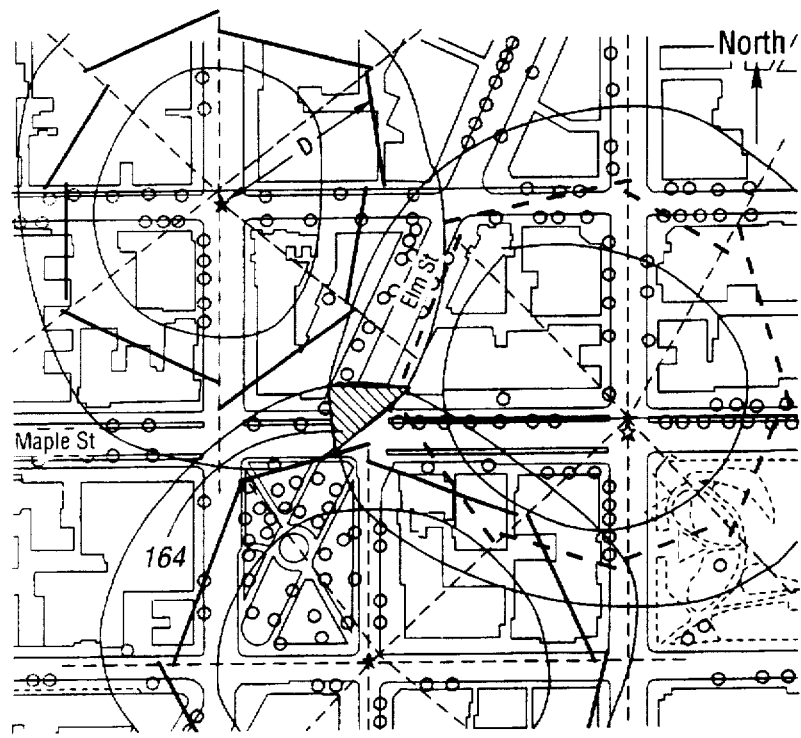
Fig. 23
Fig. 24
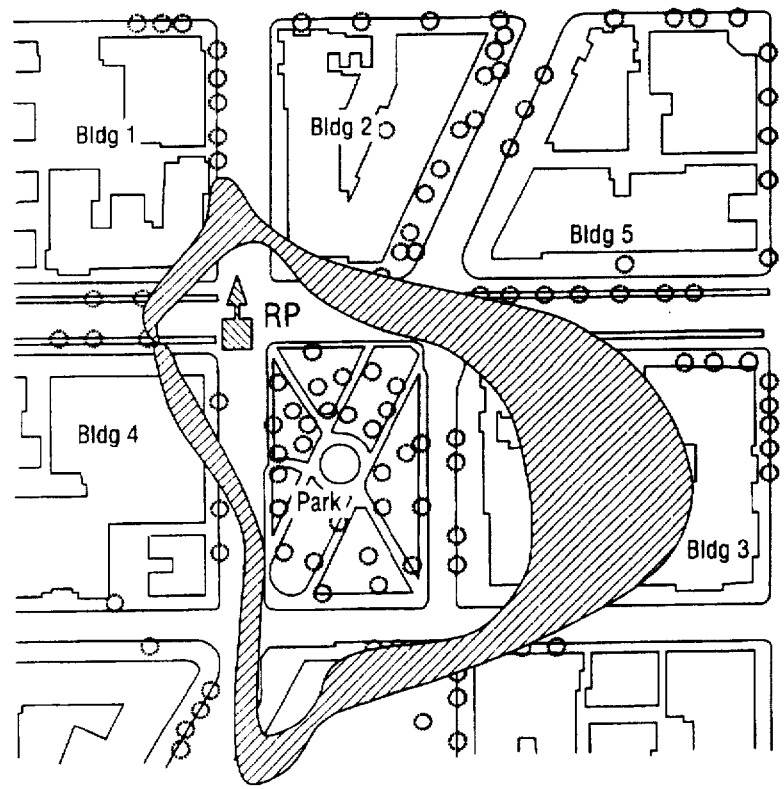

5,768,686

METHOD AND SYSTEM FOR POSITION DETERMINATION USING VIDEO DIAL TONE

CROSS REFERENCE TO RELATED APPLICATION

This application is a continuation-in-part of U.S. patent application Ser. No. 08/314,477, filed Sep. 28, 1994 entitled Positioning System and Method now U.S. Pat. No. 5,602,903.

TECHNICAL FIELD

The present invention relates generally to positioning systems. More particularly the invention relates to a method and system for determining the position of a mobile unit in a wireless communication system or public land mobile telecommunications system including a plurality of base stations by generating and analyzing scaled contour shapes having minimum and maximum boundaries for each of the base stations in accordance with their individual Radio Frequency (RF) measurements. Position information is provided to a calling party via a Video Dial Tone (VDT) network.

BACKGROUND ART

Most metropolitan areas are now equipped with one or more forms of wireless communication networks which provide mobile telephone and other related services to customers across a broad frequency spectrum. Consider, for example, what has come to be known as "cellular" telephone services or Personal Communication Services "PCS", i.e., radio transmissions in the frequency band between approximately 800 MHz and 2.2 GHz.

As shown in FIG. 1, prior art cellular telephone systems 10 include a Mobile Telephone Switching Center (MTSC) 12 and a plurality of base stations such as cell site transceivers 14a–14c. The cell site transceivers transmit radio signals to and receive radio signals from one or more mobile units 16 that move about a cellular service area 20. A mobile station, as the term is used herein, refers to a wireless voice telephone or data transceiver that can be permanently installed at a fixed location or within a vehicle or that can be portable. The term mobile station is equivalent to the term mobile unit, therefore, they are used interchangeably. Each cell site transceiver 14 is able to broadcast and receive radio signals within a geographic area 18 called the cell site coverage area. Together, the areas 18 comprise the entire cellular service area 20. Typically, a cellular service area comprises a metropolitan area or larger region.

When a telephone call to a called mobile unit 16 originates from either another mobile unit or a landbased telephone via a Public Switched Telephone Network (PSTN) 22, a caller must first access the cellular telephone system 10. This task is accomplished by dialing the mobile unit's 16 unique identification number (i.e., its phone number). The MTSC 12 receives the call request and instructs the control unit, i.e., the central call processor 24 to begin call processing. The central call processor 24 transmits a signal over a dedicated line 26 (such as a telephone line or microwave link, etc.) to each of the cell site transceivers 14a–14c causing the cell site transceivers to transmit a page signal that the mobile station 16 receives. The page signal alerts a particular mobile station 16 that it is being called by including as part of the page signal the paged mobile unit's 16 identification or phone number.

Each cell site transceiver 14 transmits the page signal on one or more dedicated forward control channels that carry all pages, as well as control signals, channel assignments, and other overhead messages to each mobile unit 16. The forward control channel is distinct from the voice channel that actually carries voice communications between one mobile and another mobile station or a land-based telephone. Each cell site transceiver may have more than one forward control channel upon which pages can be carried.

When a mobile station 16 is not engaged in a telephone call, it operates in an idle state. In the idle state, the mobile station 16 will tune to the strongest available forward control channel and monitor the channel for a page signal or other messages directed to it. Upon determining that a page signal is being transmitted, the mobile unit 16 again scans all forward control channels so as to select the cell site transceiver 14a–14c transmitting the strongest signal. The mobile unit 16 then transmits an acknowledgement signal to the cell site transceiver over a reverse control channel associated with the strongest forward control channel. This acknowledgement signal serves to indicate to the MTSC 12 which of the forward control channels (associated with the several cell site transceivers 14a–14c) to use for further call processing communications with mobile unit 16. This further communication typically includes a message sent to the mobile station instructing it to tune to a particular voice channel for completion of call processing and for connection with the calling party.

The details of how the cell site transceivers transmit the signals on the forward and reverse control channels are typically governed by standard protocols such as the EIA/TIA-553 specification and the air interface standards for Narrowband Analog Mobile Phone Services (NAMPS) IF-88, all of which are well known to those of ordinary skill in the wireless telephone communications art and therefore will not be discussed.

While cellular networks have been found to be of great value to mobile users whose travels span many miles, they have also been found to be prohibitively expensive to implement for small scale applications wherein system subscribers only desire wireless telephone services in limited geographic areas, such as, for example, within office buildings or in campus environments.

The Personal Communications Network (PCN) is a relatively new concept in mobile communications developed specifically to serve the aforementioned applications. Similar to cellular telephony goals, a Personal Communications Network goal is to have a wireless communication system which relates telephone numbers to persons rather than fixed locations. Unlike cellular telephones, however, the PCN telephones are directed to small geographic areas thus defining "microcellular" areas designed to operate in similar fashion to large scale cellular telephone networks. PCN technologies are also similar to residential cordless telephones in that they utilize base stations and wireless handsets. Unlike the former, however, PCN technology utilizes advanced digital communications architecture, such as, for example, PACS, formerly called WACS (Bellcore), DECT (European), CDMA (Omnipoint), PHS-PHP (Japan), IS-54 (TDMA), PCS-1900 (GSM), and features which may be implemented either as private networks or regulated services. When offered by communications carriers as services, this PCN capability is generally referred to as Personal Communications Services (PCS), and may be situated in a wide variety of environments, including, for example, outdoor urban, suburban, rural, indoor single-level and indoor multilevel areas.

As shown in FIG. 2, prior art PCS systems 28 include one or more control units 30 which, in accordance with the American National Standards Institute (ANSI) T1P1 working document for stage 2 service description, as known to those skilled in the art, are termed Radio Port Controllers (RPCs), Radio Access System Controllers (RASCs), access managers, etc. These control units 30 operate in similar fashion to the MTSC 12 of the cellular telephone network and, therefore, are provided in electrical communication with the Public Switched Telephone Network 22. A plurality of base stations or Radio Ports (RPs) 32 are also provided which transmit radio signals to and receive radio signals from one or more subscriber wireless telephones 16, termed mobile units or Radio Personal Terminals (RPTs) that move about a PCS service area 34. Each Radio Port 32, like cell site transceivers 14, is able to broadcast and receive radio signals within a geographic area 36 called the Radio Port coverage area. Together, the areas 36 comprise the entire PCS service area 34.

A generalized reference architecture for the PCS system of FIG. 2 is shown in further detail in FIGS. 3a–3b. The reference architecture includes reference elements which support radio access, wireline access, switching and control, mobility management, and Operations, Administration, Maintenance and Purchasing (OAM&P). As shown in the schematics, the PCS system includes a PCS Switching Center (PSC) 38 which supports access independent call/service control and connection control (switching) functions and is responsible for interconnection of access and network systems to support end-to-end services. The PCS switching center 38 represents a collection of one or more network elements. The system further includes a Radio Access System Controller (RASC) 40 which supports the wireless mobility management and wireless access call control functions. It serves one or more subtending radio port controllers 42 and may be associated with one or more PCS switching centers 38. As known to those skilled in the art, Radio Port Controllers 42 provide an interface between one or more subtending Radio Port Intermediaries (RPIs), a PCS switching center such as PSC 38, and RASC, air interface independent radio frequency transmission and reception functions.

The system further includes a Radio Port Intermediary (RPI) 44 which provides an interface between one or more subtending Radio Ports 46 and the Radio Port Controller 42, and supports air interface dependent radio frequency transmission and reception functions. Radio Port 46 supports the transmission of signals over the air interface and is provided in communication with Radio Personal Terminal (RPT) 48. This is a light-weight, pocket-size portable radio terminal providing the capability for the user to be either stationary or in motion while accessing and using telecommunication services.

The system further includes variations of RPTs which are in fixed locations, termed Radio Termination (Type 1) 50 and Radio Termination (Type 2) 52, which interface Terminal Equipment (Type 1) 54 and Terminal Equipment (Type 2) 56 to the Radio Access Interface.

The system of FIGS. 3a–b further includes a Terminal Mobility Controller (TMC) 58 which provides the control logic for terminal authentication, location management, alerting, and routing to RPT/RTs. There is also provided a Terminal Mobility Data-store (TMD) 60 which is operative to maintain data associated with terminals.

Still further, the system includes a Personal Mobility Controller (PMC) 62 which provides the control logic for user authentication, service request validation, location management, alerting, user access to service profile, privacy, access registration, and call management. PMC 62 is provided in communication with a Personal Mobility Data-Store (PMD) 64 which maintains data associated with users.

Finally, the system includes Operations, Administration, Maintenance, and Provisioning, (OAM & P) systems 66 which monitor, test, administer, and manage traffic and billing information for personal communications services and systems. PCS 38 is also provided in communication with Auxiliary Services 68, Interworking Functions (IWF) 70 and External Networks 72. In accordance with the above-referenced working document for Stage 2 service description, Auxiliary Services 68 are defined as a variety of services such as voice mail, paging, etc. which may not be provided by the PCS 38. IWF 70 are further defined as mechanisms which mask the differences in physical, link and network technologies into consistent network and user services. Still further, External Networks 72 are defined as other voice, digital data, packet data, and broadband data networks.

FIG. 4 provides a unified functional model of the detailed system of FIG. 3. This functional model is derived from the PCS reference architecture in FIGS. 3a–3b by aggregating the terminal entities (RT and RPT) into a single functional grouping Radio Terminal Function (RTF), and aggregating RP, RPI, and RPC into another single functional grouping RCF in accordance with the ANSI Stage 2 service descriptions for PCS. The model includes Call Control Function (CCF) 74, Service Switching Function (SSF) 76, Service Control Function (SCF) 78, Service Data Function (SDF) 80, Service Resource Function (SRF) 82, Radio Access Control Function (RACF) 84, Radio Control Function (RCF) 86, and Radio Termination Function (RTF) 88. The functions of the terminal elements are more fully described in the Stage 2 service description for PCS.

Wireless communication services such as the above cellular and PCS systems, have been quickly embraced by those people whose business requires them to travel frequently and to be in constant communication with their clients and associates. The increased use of wireless communication services, however, has caused headaches for emergency operators and other position dependent service providers who require precise location data. As known to those skilled in the art, under current wireless technology, position data is strictly limited to relatively large coverage areas and sectors thereof as defined by the RF characteristics, i.e. footprints, of the associated base station. As explained below, these coverage areas are generally unsuitable for most commercial and consumer applications.

In the late 1960's, federal legislation was enacted which established the 9-1-1 telephone number as a national emergency resource. In land-based systems, Enhanced 9-1-1 (E 9-1-1) wireline technology provides the caller's Automatic Location Identification (ALI) information with reasonable accuracy, cost and reliability, to a Public Safety Answering Point (PSAP) via a defacto standard. ALI is generally accomplished by receiving the ANI, or Automatic Number Identification, during call setup to the PSAP. A database query, given ANI, provides ALI to the emergency call taker display terminal as both parties establish the voice channel.

Currently wireless technology, however, does not provide ALI. As a result, an ever-increasing percentage of emergency telephone calls can be tracked no further than the originating base station. As readily seen, the heart of the problem for providing E9-1-1 ALI services for wireless communication customers lies in accurately and reliably determining the mobile unit, i.e., handset location, under any circumstance, at low cost.

Against this background, there have been previous attempts to provide methods and systems which generally identify the positions of wireless communication system users in cell site coverage areas and sectors thereof. See, for example, U.S. Pat. No. 4,876,738 issued to Selby and assigned to U.S. Phillips Corporation. Selby discloses a registration procedure in which the base station monitors the location of the mobile unit by cell site. The effect is to allow enlargement of the registration area if the mobile unit consistently roams between two cells.

See also, U.S. Pat. No. 5,179,721 issued to Comroe et al and assigned to Motorola, Inc. Comroe discloses a method for inter-operation of a cellular communication system and trunking communication system by transmitting an access number for each system such that the mobile unit may be used as a cellular telephone and a trunking communication device.

Still further, see U.S. Pat. No. 5,097,499 issued to Consentino and assigned to AT&T Bell Laboratories. Consentino teaches a method for preventing an overload in a reverse channel by delaying the time of the generation of timing stamps on markers.

These methods and systems, however, have proven unsuitable for commercial and consumer applications where users may, at any given time, travel through very small portions of numerous cell site coverage areas and sectors. Under current wireless technology, and as described in the prior art referenced above, presently available positioning methods and systems are limited to a determination of whether the user is within one or more predetermined cell site coverage areas or sectors. These prior art systems are incapable of providing further detail, i.e. exactly where in the cell site coverage area the user is located.

Prior art attempts to design higher accuracy positioning systems which utilize commercial broadcast transmissions, for example, have also met with limited success. See, for example, U.S. Pat. Nos. 4,054,880 (Dalabakis et al) and 3,889,264 (Fletcher) which disclose what are known as "delta-position" systems. These prior art patents describe systems using three spectrally spaced-apart radio signals, each of which is an independent AM radio signal. The systems typically have a vehicle carried mobile receiver, with a separate tuner for each station, and a second receiver at a fixed, known position. As disclosed, these systems count "zero crossing counts", each of which indicates that the user has moved a certain distance from his or her previous location. In operation, if it is desired to determine the current position of the user, a starting position must first be specified. A fixed position receiver detects frequency drift of the transmitters, which is used to adjust and coordinate zero crossing counts made by the mobile receivers.

These systems are termed "delta-position" systems because they determine only the distance and direction traveled by a mobile user from any particular starting point. Neither Dalabakis et al nor Fletcher actually determines the position of the mobile user.

See also, U.S. Pat. No. 5,173,710 to Kelley et al which discloses the use of a fixed position receiver which is adapted to determine frequency drift along with the relative phases of various unsynchronized FM broadcast signals originating from known fixed locations. As disclosed by Kelley, each of the fixed transmitters transmits a beacon signal having a phase that is unsynchronized with the phases of the beacon signals of the other transmitters. These signals are 19 Khz analog pilot tones generated by commercial broadcast stereo FM stations. The fixed receiver receives the beacon signals, determines the relative phases of the beacon signals, and broadcasts data representing these relative phases for receipt by the mobile receiver which is at an unknown location. Each mobile receiver includes phase measurement circuitry that detects the phases of the beacon signals at the mobile receiver's current position on multiple distinct carrier frequencies such that the current position of the mobile unit 16 may be determined when used in conjunction with the fixed receiver broadcast data.

See also, U.S. Pat. Nos. 5,055,851; 4,891,650; and 5,218,367, all issued to E. Sheffer and assigned to Trackmobile, Inc. Like the '650 patent, the '851 patent utilizes measurements of the mobile unit's 16 signal strength which is detected by some number of neighboring base stations in order to calculate location. In operation, each base station transmits a special packet of data which includes this information for receipt by the MTSC. Another packet of information, the actual vehicle alarm distress call (this is not the same as a 9-1-1 call) , is also sent to the MTSC. The MTSC sends these two information packets to a Trackmobile alarm center personal computer. The computer matches both packets using a simple algorithm in order to find the vehicle's distance from the base station cell center point. As disclosed, this is done preferably with four neighboring base station cell site measurements along with arcuation or line intersection techniques. The results are displayed on a computer screen map. A 9-1-1 call may then be initiated by a Trackmobile attendant, based on a verbal request from the originating mobile user.

The Trackmobile '367 patent operates in much the same way as the '851 and '650 patents although it uses a modified handset including a modem, to send signal strength measurements received at the mobile unit 16, through the cellular network to the Trackmobile alarm center. Only the downlink signal strengths, received at the mobile unit 16, are used to estimate location. The location is determined from the same algorithm as in the '851 patent, but includes a refinement—antenna sector ID—if known. As disclosed, the sector ID information reduces error by effectively slicing the cell circle into one of three pie-shaped sections. In the case of low power PCS installations, it is likely that omnidirectional antennas would be used, thus precluding the use of this sector refinement.

None of the systems referenced above, as well as general time difference of arrival location systems such as LORAN, NAVSTAR, and GPS, as used for example in U.S. Pat. No. 4,833,480, issued to Palmer et al, have proven suitable for commercial applications since, by design, they require specially adapted receivers to receive and process the pilot tones, GPS signals, etc. at the mobile unit 16. This sophisticated end equipment, of course, significantly adds to the cost of the corresponding mobile unit. In the case of hand portable units, this additional equipment further results in a handset which is extremely bulky and difficult to handle. As a result, these systems have proven unsuitable for both large scale commercial applications, as well as ordinary consumer use.

When applied to wireless communications of interest to the present invention, i.e. communications in the frequency band from 800 MHz to 2.2 GHz, these prior art systems are further considered unsuitable for commercial applications in view of their anticipated use of excessive frequency spectrum. More specifically, it is anticipated that for proper operation, these systems would necessarily require transmission of signals on separate channels which would utilize an unacceptable amount of additional spectrum.

The prior art systems also fail to account for changes in environmental conditions. For example, GPS receivers require a clear view of at least 3-4 satellites to perform an accurate location estimate of the mobile unit. In dense urban areas, however, especially at the street level during summer months, is often the case that this condition will not be satisfied. Thus, no location estimate would be available.

In many office buildings, the metal content of the windows is also sufficient to preclude effective satellite reception. To this end, if all wireless antennas were isotropic and were located in flat and open terrain, estimating the location of a handset using the prior art signal technology might be sufficient. Unfortunately, the known disadvantage of the PCS world, and to a reasonable extent, cellular, is that they do not operate in flat and open terrains. Thus, none of the prior art approaches are acceptable in areas where there are obstructions to the radio signal's path such as buildings, trees, hills, and automobiles. Seasons are also known to have a dramatic affect on propagation where radio waves are significantly attenuated by tree leaves in the summer, but less so in the winter. Thus, actual RF field data gathered in one season may not be accurate in another season.

As readily seen, precisely predicting location based on RF propagation loss has generally been an intractable problem, due to the complexity of factors, as well as the data collection difficulties in constructing the necessary databases needed to supply the actual field data. Thus, the principles relied upon by the above-referenced patents, such as free space loss or clear access to satellites, rarely exists, as obstructions and interference increases daily, even in the most optimal RF environments.

Consequently, a need has developed to provide a positioning system and method which may be practically and economically implemented for use in wireless communication systems and, in particular, in the frequency band from 800 MHz to 2.2 GHz.

Still further, a need has developed to provide such a positioning system which may be used by service providers to provide location information for use in emergency situations such as locating an E9-1-1 caller, enforcing restraining orders and house arrests, confirming the intended location of a user at predetermined times and the like. It is further desirable that such a system and method be compatible with existing wireless telephone technology and should not degrade the operation of an existing system. Finally, such a system should neither require the allocation of more radio frequencies than are currently allocated to wireless telephone systems, nor require a substantial portion of existing wireless frequencies.

DISCLOSURE OF THE INVENTION

It is a general object of the present invention to overcome the limitations of the prior art by providing a positioning system and method for accurately determining the location of a mobile unit in a plurality of environments, including rural, suburban, urban and similar arena environments.

More particularly, it is an object of the present invention to provide a method for determining the position of a mobile unit in a wireless communication system including a plurality of base stations each having a corresponding coverage area, by generating scaled contour shapes having minimum and maximum boundaries based upon the determined analog and/or TDMA RF measurements of each of the base stations.

Still further, it is an object of the present invention to provide a method and system for determining and reporting the position of a mobile unit to a third party via a Video Dial Tone (VDT) network.

In carrying out these and other objects, features and advantages of the present invention, a method is provided for determining the position of a mobile unit 16, such as, for example, a wireless telephone, Personal Digital Assistant (PDA) or similar interactive electronic device.

According to the invention, the method is provided for use in a wireless communication system, sometimes also referred to as a public land mobile telephone system, which includes a plurality of base stations each having a corresponding coverage area. For each of the base stations, a plurality of RF measurements are determined in cooperation with a receiver, including the link budget of the base station, for a predetermined plurality of distances and directions. The determined analog and/or TDMA RF measurements for each of the base stations are modeled as a scaled contour shape having minimum and maximum boundaries and which are capable of being projected on a mapping system such as an orthophotograph.

When a VDT caller desires the location of a desired mobile unit 16, a call is generated for receipt by the mobile unit 16. The VDT call includes an alert message which is modified to suppress ringing of the called mobile unit 16. Thereafter, the base stations which neighbor the mobile unit 16 are determined and their corresponding analog and/or TDMA RF measurements contours are analyzed to further determine where they intersect.

In accordance with the invention, the intersections of these neighboring base station modeled and scaled contours will define a bounding polygon area that describes the position of the mobile unit 16 in terms of minimum and maximum error estimate. Once the bounding polygon area has been defined, the latitude and longitude of the center of the polygon area may also be determined whereupon the street addresses contained therein may be learned through reference to one or more databases.

The bounding polygon area may thereafter be overlayed on an orthophotograph to form a location picture which may be transmitted to the VDT caller in digital form for display on the caller's video terminal.

In the preferred embodiment, the VDT network includes an Interactive Video Delivery System (IVDS) and a Set Top Terminal (STT) which is provided in electrical communication with the IVDS and the video monitor.

In keeping with the invention, the modeling of the determined analog and/or TDMA RF measurements as scaled contour shapes requires the initial segmenting of the coverage areas of each of the base stations into a plurality of arc segments. For each of the arc segments, a plurality of single or multiple regressions are thereafter performed so as to convert actual data into a corresponding plurality of mathematical curve-fit equations, each representing a relationship between a predetermined measurable variable, i.e. Relative Signal Strength Indication uplink ($RSSI_{up}$), Relative Signal Strength Indication downlink ($RSSI_{down}$), Word Error Rate uplink ($WER_{up}$), Word Error Rate downlink ($WER_{down}$), Quality Indication uplink ($QI_{up}$), Quality Indication downlink ($QI_{down}$), Time Differential uplink ($TD_{up}$), Time Differential downlink ($TD_{down}$), etc. and distance from the base station.

For each of the arc segments, the degree of fit of the corresponding mathematical equations may thereafter be determined by comparing each of the mathematical equations with actual data. The equations may further be optimized by using a set of heuristic rules to determine which has the best correlation and least standard error for a predetermined portion of each arc segment. Finally, the optimized mathematical equations may be combined for each arc segment so as to form the scaled contour shape corresponding to each base station.

In an alternative embodiment, a Genetic Algorithm (GA) may further be used to optimize the parameters of each of the single or multiple regressions so as to further improve the degree of fit for greater correlation and minimum standard error.

In another alternative embodiment, fuzzy logic techniques may be used to quantize the best RF measurement using a set of fuzzy rules for optimizing the correlation of RF measurements with respect to distance.

Still further, in yet another alternative embodiment, in cases where there is generally poor correlation between all of the mathematical equations of an arc segment and the actual data, such as areas of highly variable shadow and/or Rayleigh fading, the corresponding base station may be instructed along with the receiver, i.e., the mobile unit 16, to each temporarily change their transmission frequencies by 10–40 MHz. Thereafter, additional RF measurements may be obtained for the base station at the changed frequency for the same predetermined plurality of distances and directions, thus yielding an increased number of variables for consideration and analysis.

In carrying out the above objects, there is further provided a positioning system in accordance with the present invention. The system includes a wireless communication system having at least one base station such as a cellular tower or Radio Port which is operative to receive calls originating from and send calls to one or more mobile stations over air interface channels in cooperation with a control unit such as a Mobile Telephone Switching Center (MTSC) 96 or a Radio Port Controller (RPC) 95, as shown in FIG. 5. The control unit and at least one base station together form at least one registration area (RA).

The positioning system further includes a Video Dial Tone (VDT) network which includes an Interactive Video Delivery System (IVDS) and a Set Top Terminal (STT). The STT is provided in electrical communication with a video monitor associated with a third party caller. A location databank is also provided which is operative to store real-time analog and/or RF measurements for the base station, including its link budget. Finally, the system includes a Location Adjunct Processor (LAP) such as an Intelligent Peripheral (IP) or the like, which is in electrical communication with the location database and the control unit. The LAP is operative to access the location database through a service logic program to determine and forward the location of the mobile unit to the control unit.

In the preferred embodiment, a positioning system is provided specifically for use in a modified Advanced Intelligent Network (AIN). The system includes a control unit such as an MTSC 96 when used in a cellular system, or a RPC when used in PCS 94 systems. At least one base station is also provided in electrical communication with the control unit. There is further provided a Service Transfer Point (STP) and a Service Control Point (SCP) which are in electrical communication with one another. The SCP is operative to invoke a plurality of Service Logic Programs (SLPs). Specifically, the SCP is operative to determine the current RA of a selected mobile unit 16 and generate alert messages to all corresponding control units and base stations within the RA at the request of the VDT caller. In keeping with the invention, and with reference to the ANSI Stage 2 service architecture of FIG. 3b, the SCP can be used to embody the functions of the TMD 60 and/or the TMD 58, PMC 62, PMD 64, OR RASC 40. The system further includes a Service Switching Point (SSP) in electrical communication with the control unit and the STP.

As disclosed in this embodiment, the SSP is operative to temporarily suspend call processing and to send a call information request signal to the SCP via the STP so as to invoke the SLP and inform the LAP that the location of a mobile unit 16 is desired by the VDT caller. The SLP then informs a terminating ISDN/AIN switch to call the mobile unit 16 to suppress transmission of audible ringing signals to the mobile unit.

A location databank operative to store realtime RF measurements for the base station, including its link budget, is also provided. Finally, the system includes a Location Adjunct Processor (LAP) in electrical communication with the control unit, the location database, and the SCP. The LAP is operative to access the location database to determine and forward the location of the mobile unit to the control unit at the request of the SLP.

BRIEF DESCRIPTION OF THE DRAWINGS

The foregoing aspects and many of the attendant advantages of this invention will become more readily appreciated as the same becomes better understood by reference to the following best modes for carrying out the invention, when taken in conjunction with the accompanying drawings wherein:

FIG. 8 is a representative curve fit graph obtained from the generic curve fit database used in accordance with the present invention;

FIG. 9 is a data regression diagram of typical data obtained when utilizing the Bollinger Band database in accordance with the present invention;

FIG. 12 is a data regression diagram of a first sample curve-fit data plot before and after a manual search;

FIG. 13 is a data regression diagram of a second sample curve-fit data plot before and after a manual search;

FIG. 14 is a data regression diagram of a third sample curve-fit data plot before and after a manual search;

FIG. 15 is a data regression diagram of a fourth sample curve-fit data plot before and after a manual search;

FIG. 21 is a block diagram of the method steps used in accordance with the present invention to obtain scaled contoured shapes;

FIG. 22 is a Venn diagram of an example bounding polygon defined by two base stations;

FIG. 23 is a Venn diagram of the bounding polygon of FIG. 14 as projected on an orthophotograph which may be stored digitally; and FIG. 24 is a Venn diagram of a sample bounding polygon defined by a single base station.

BEST MODES FOR CARRYING OUT THE INVENTION

Figure 5:
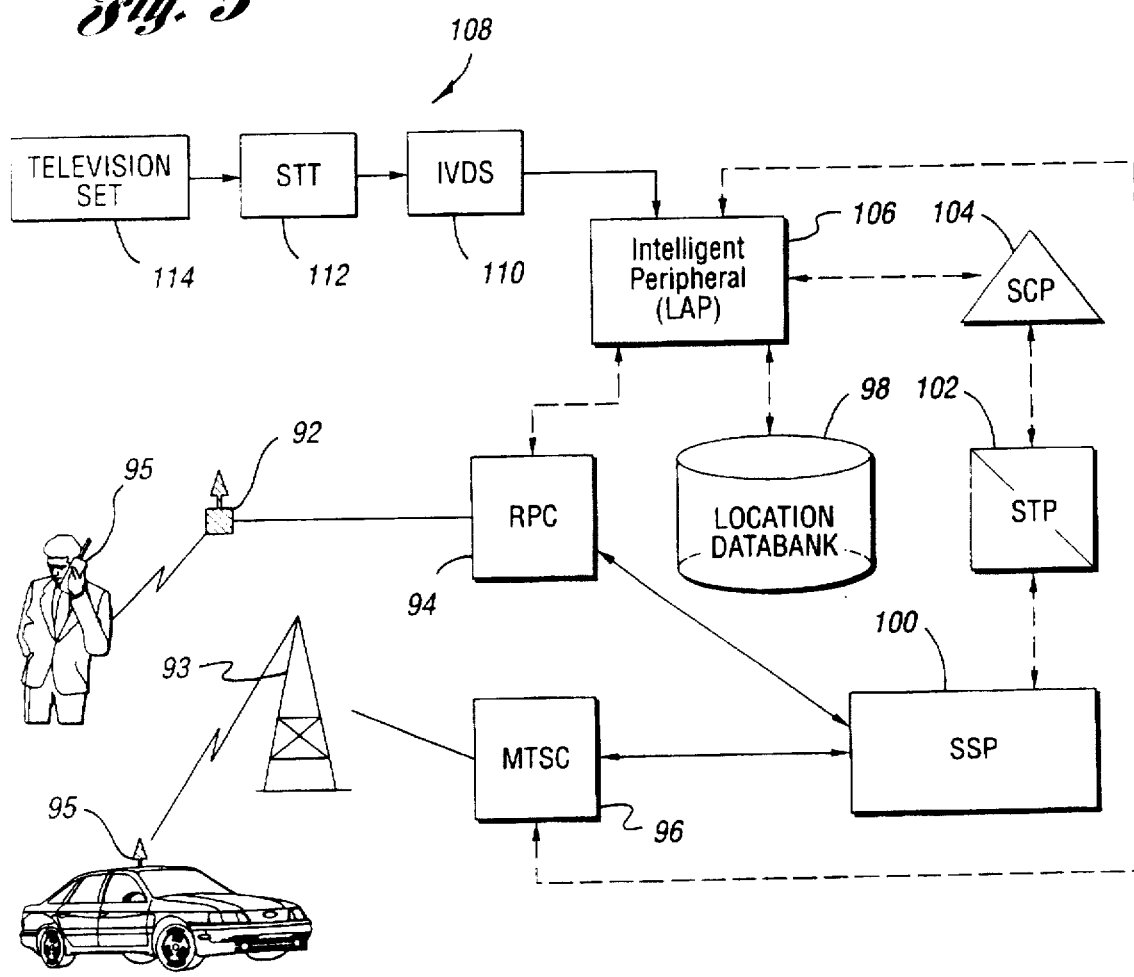
FIG. 5 is a schematic diagram of a preferred embodiment of the positioning system of the present invention adapted for use in a modified Advanced Intelligent Network (AIN)

With reference to FIG. 5 of the drawings, there is provided a schematic diagram of the generalized positioning system of the preferred embodiment of the present invention shown as adapted for use in a wireless telephone system, sometimes also called a public land mobile telecommunications system and designated generally by reference numeral 95. It should be understood, however, that the method and system of the present invention may be suitable for use with most interactive electronic devices such as the above-referenced Personal Digital Assistance (PDAs) and the like. For example, in the case where a PDA is available, through a series of mutually agreed upon message formats between the LAP and the PDA, location information can be sent to the PDA device instead of or in addition to forwarding information to a Public Switched Telephone Network (PSTN). The following disclosure is thus intended as one of example and not limitation.

In the preferred embodiment shown in FIG. 5 of the drawings, a positioning system 90 is provided which is directed for use in a modified Advanced Intelligent Network (AIN) and is operative to handle both high power cellular and low power PCS calls. System 90 includes at least one base station such as PCS Radio Port 92 which is provided in electrical communication with a control unit 94 such as a Radio Port Controller (RPC) or Radio Access System Controller (RASC), which are provided in electrical communication with the PSTN (not shown). The functions of control unit 94 may be implemented in a Mobile Telephone Switching Center (MTSC) 96 when used in a cellular telephone network or they may be implemented in an RPC or RASC when used in a PCS system or the like. A location databank 98 is also provided which is operative to store real-time RF measurements for the base stations 92, including their link budgets.

RPC 94 is provided in electrical communication with Service Switching Point (SSP) 100 which in turn is provided in electrical communication with Service Control Point (SCP) 104 through Service Transfer Point (STP) 102. RPC 94 and SCP 104 are further provided in electrical communication with a Location Adjunct Processor (LAP) such as Intelligent Peripheral (IP) 106.

As those skilled in the art will recognize, Service Switching Points 100 are generally nodes (usually the subscriber's local switch/central office switch) which provide the Service Switch Functions (SSF) that recognize the "triggers" used when a subscriber invokes an Intelligent Network Service and then communicates with the SCP 104 to operate the service. Service Control Point 104 is similarly a node which contains the service logic and associated data support to execute the required customer services. Finally, Service Transfer Point 102 is a packet switch used to route signaling messages within the Advanced Intelligent Network. These packet switching elements are known to those having ordinary skill in the art and will, therefore, not be discussed in further detail.

Still referring to FIG. 5, the positioning system 90 further includes a Video Dial Tone (VDT) network generally indicated by reference numeral 108 which includes an Interactive Video Delivery System (IVDS) 110 and a Set Top Terminal (STT) 112. The STT 112 is in electrical communication with a video monitor such as a television set 114. The STT 112 is also provided in electrical communication with the IVDS 110. Finally, the IVDS 110 is provided in electrical communication with the LAP 106.

Figure 1:
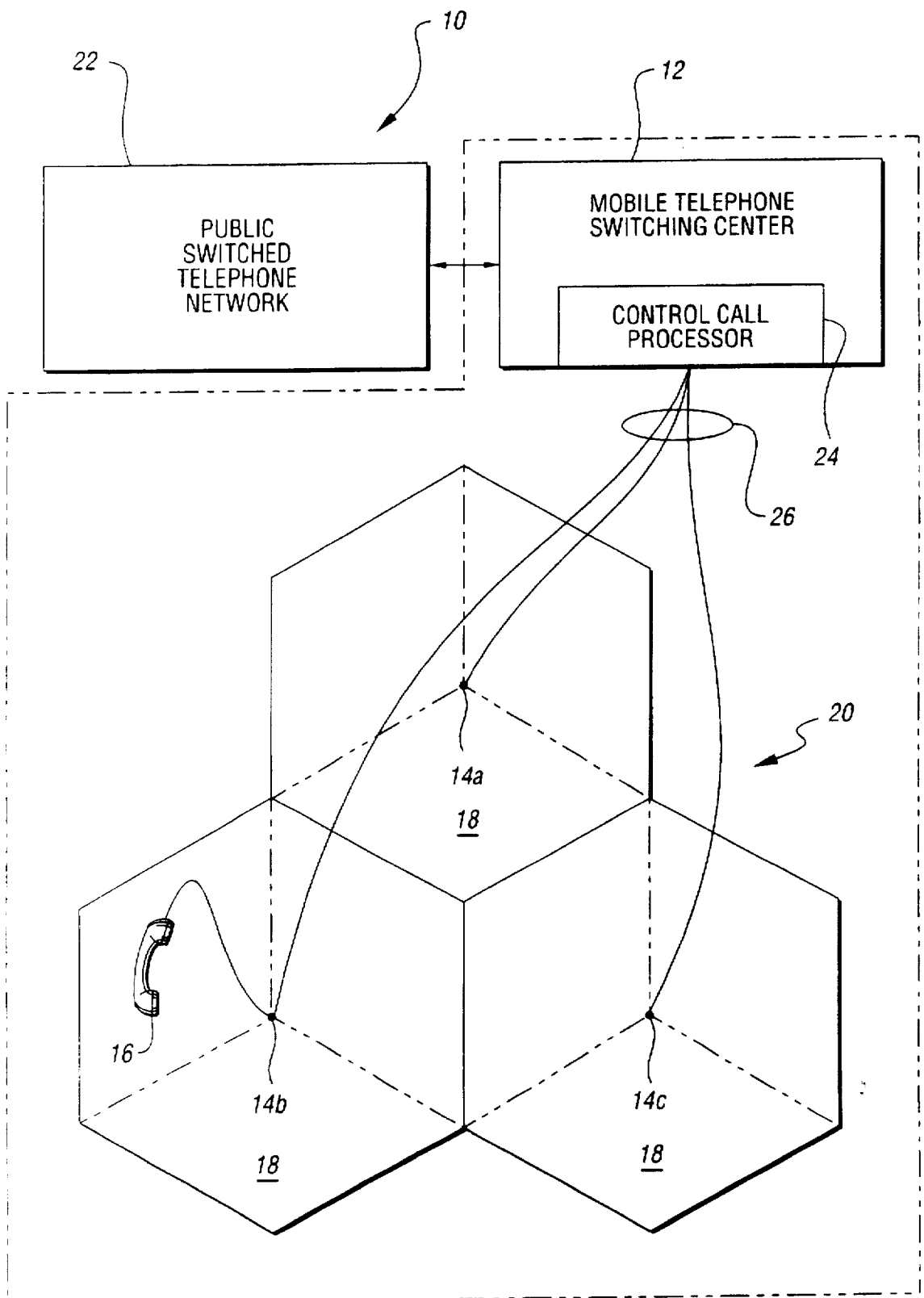
FIG. 1 is a generalized schematic diagram of a prior art cellular telephone system.
Figure 2:
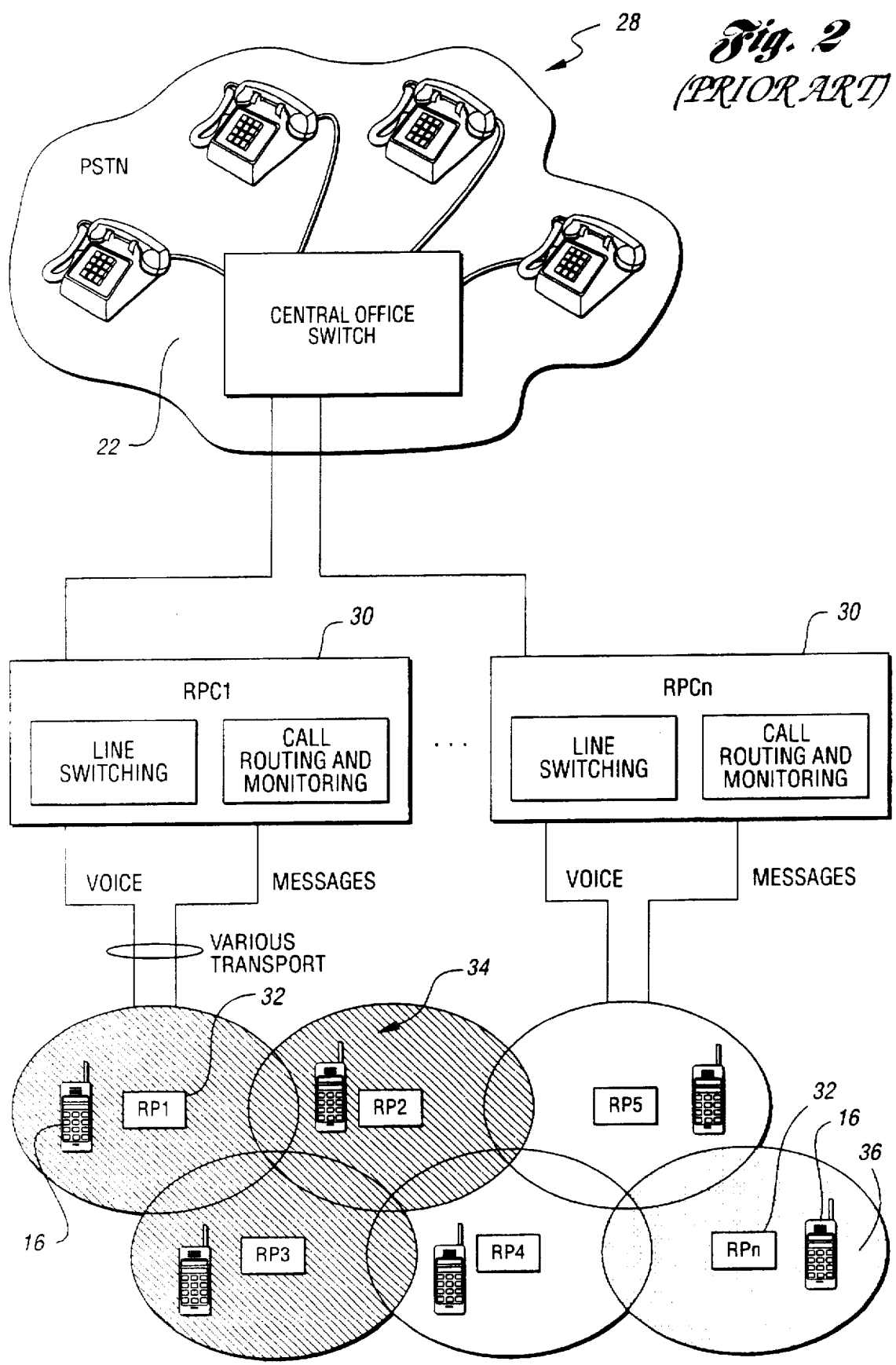
FIG. 2 is a generalized schematic diagram of a prior art Personal Communications System (PCS)
Figure 3A:
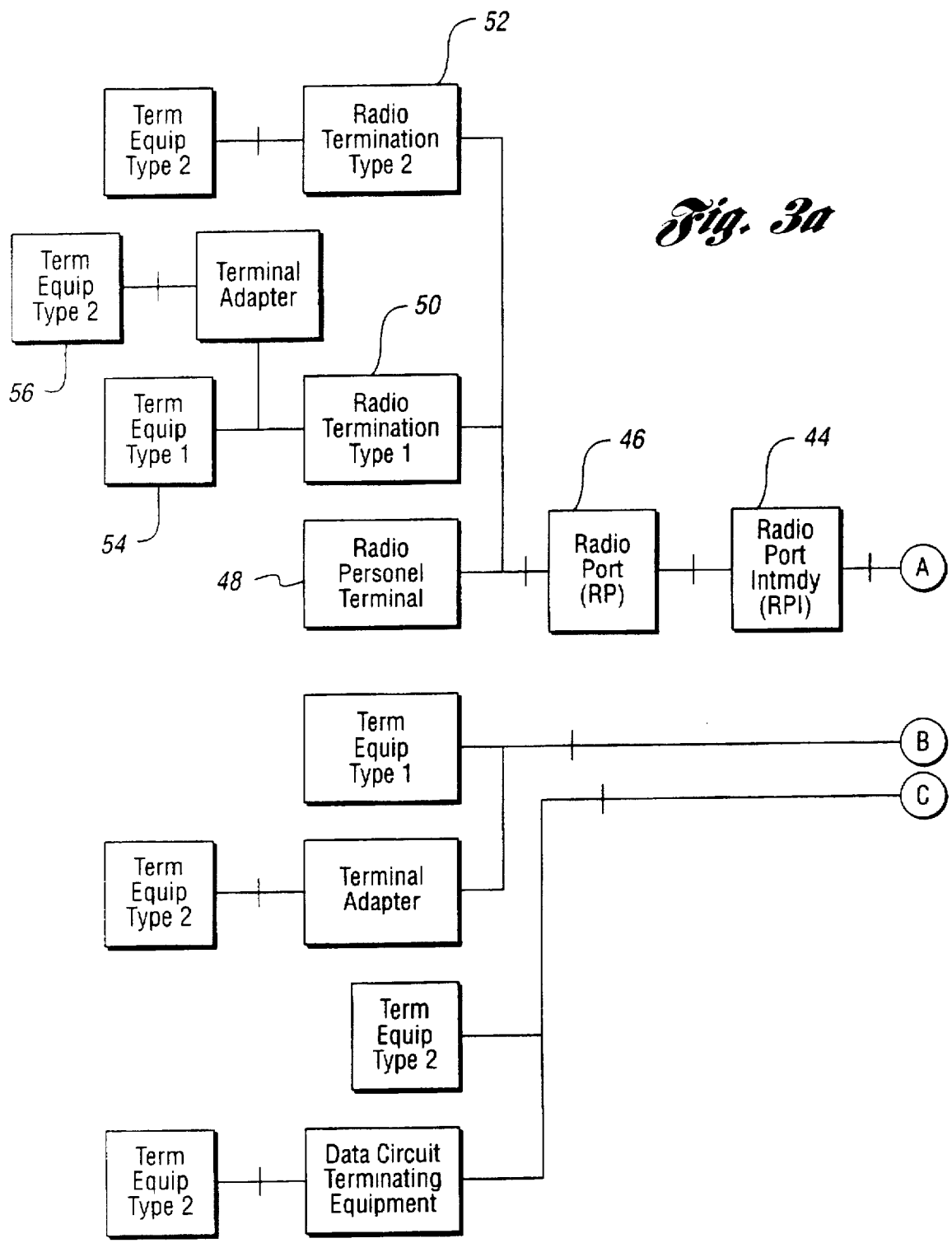
FIGS. 3a–3b are detailed schematic diagrams of the reference architecture of the PCS system of FIG. 2.
Figure 3B:
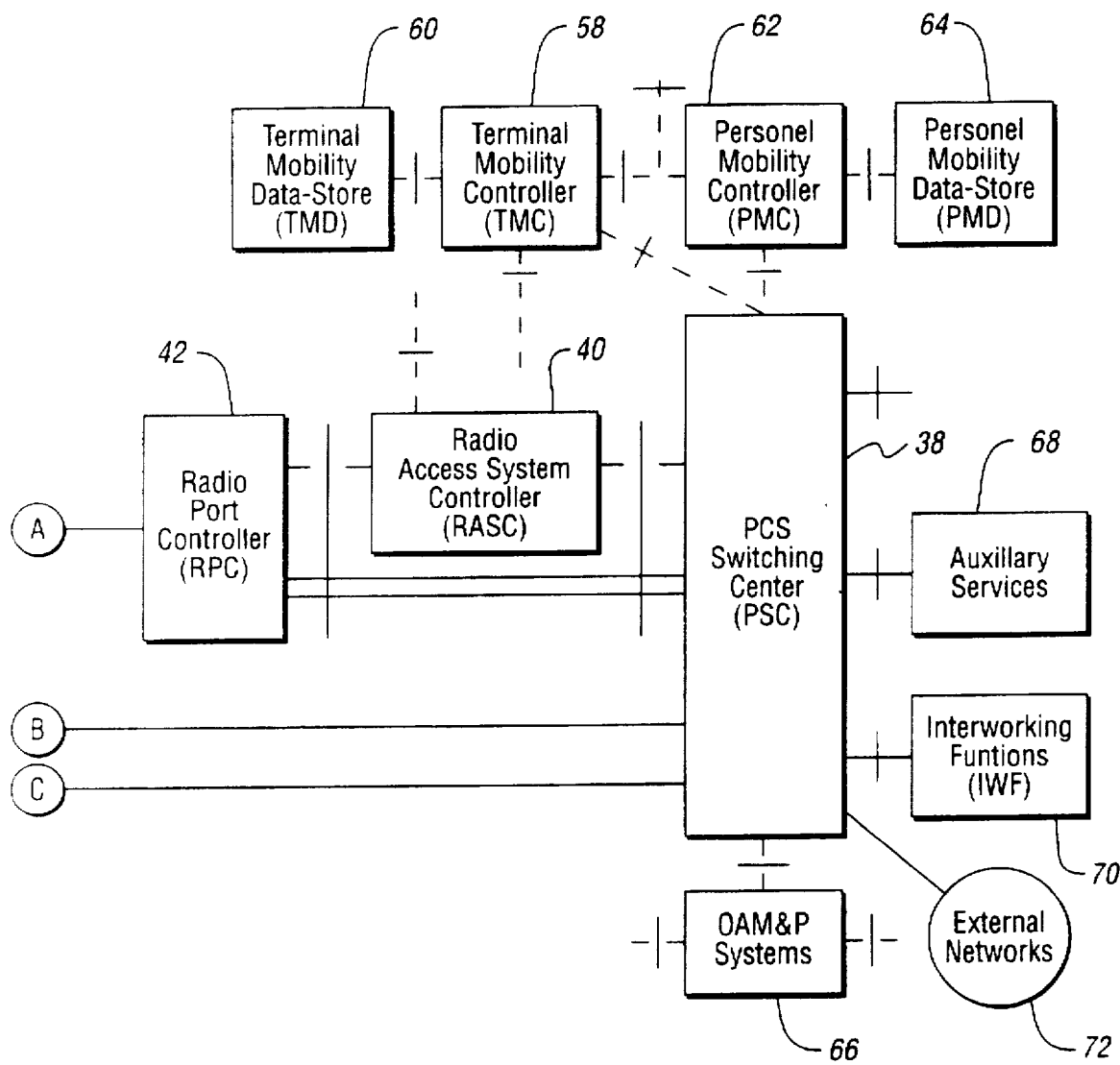
Figure 4:
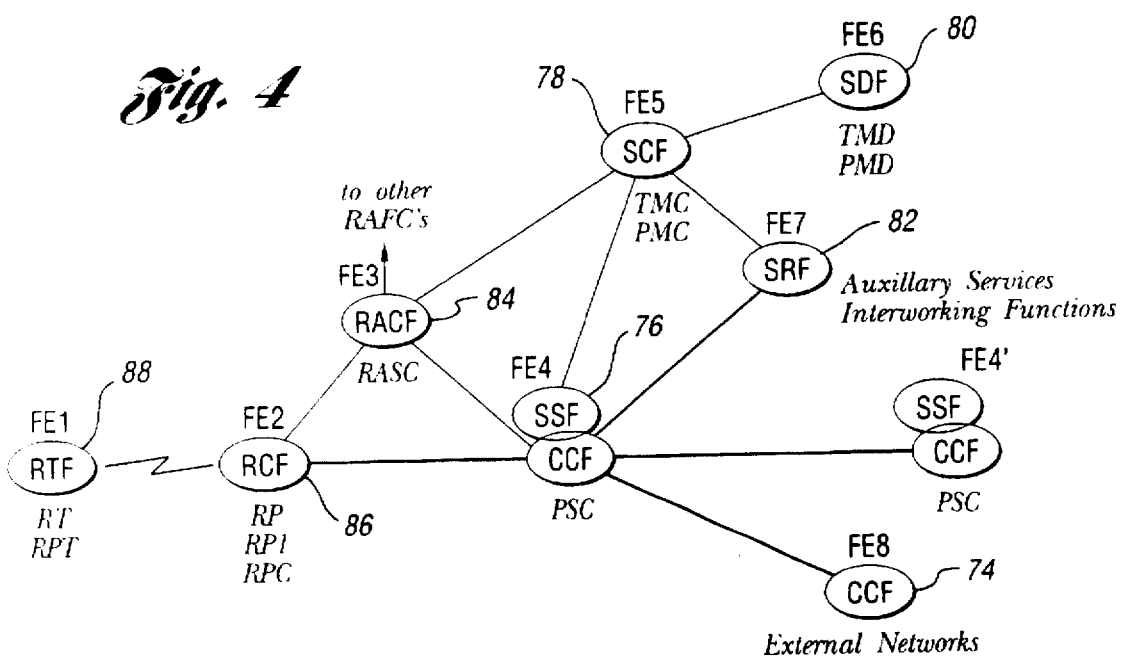
FIG. 4 is a unified functional model of the system of FIGS. 2 and 3a–3b.
Figure 6:
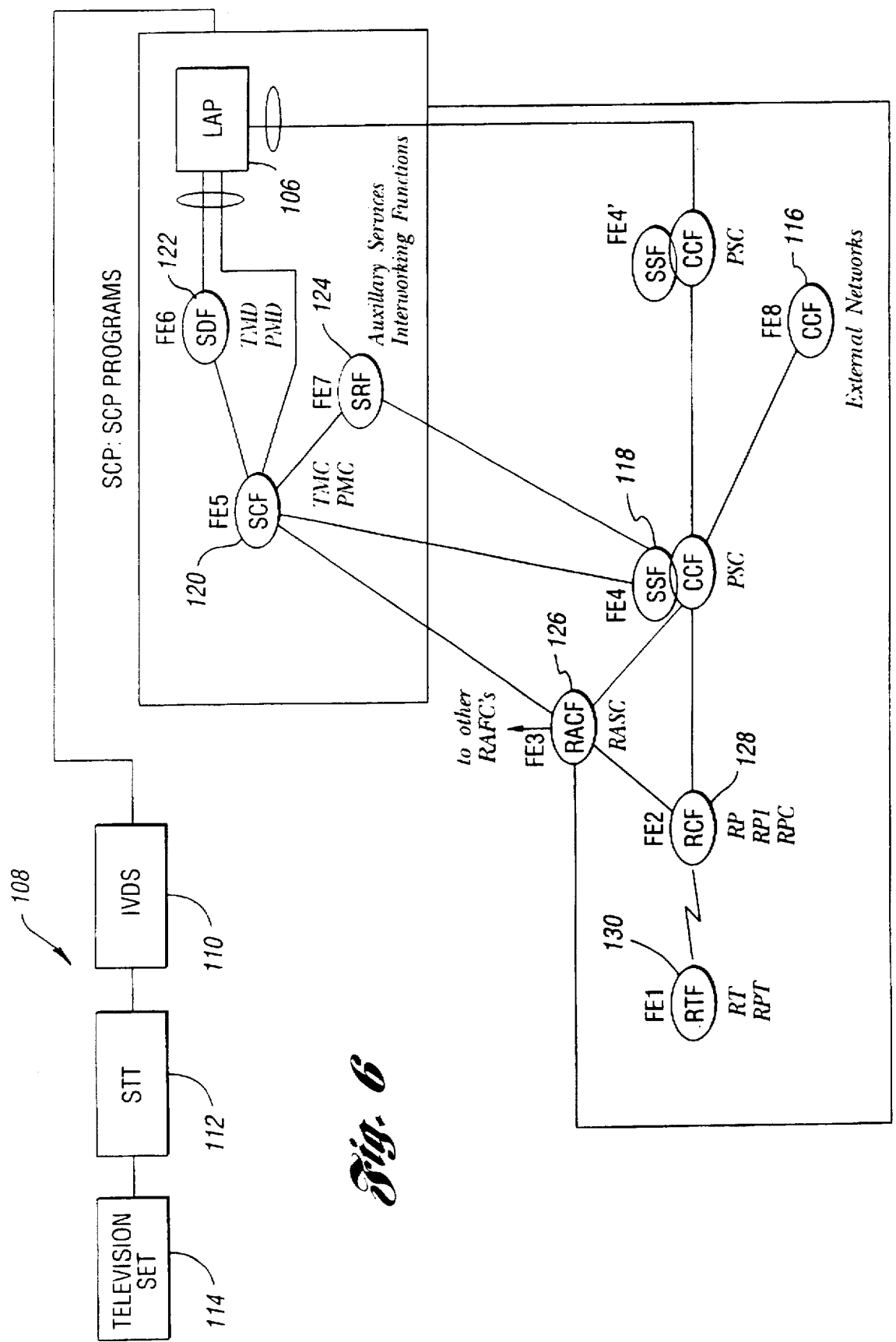
FIG. 6 is a unified functional model of the system of FIG. 5.

FIG. 6 provides a unified functional model of the detailed system of FIG. 5. Like the unified functional model of FIG. 4, this functional model is derived from the PCS reference architecture in FIGS. 3a–3b by aggregating the terminal entities (RT and RPT) into a single functional grouping radio terminal function (RTF), and aggregating RP, RPI and RPC into another single functional grouping RCF in accordance with the ANSI upstage to service descriptions for PCS. The model includes call control function (CCF) 116, service switching function (SSF) 118, service control function (SCF) 120, service data function (SDF) 122, service resource function (SRF) 124, radio access control function (RACF) 126, radio control function (RCF) 128 and radio termination function (RTF) 130. Once again, the functions of the terminal elements are more fully described in the stage to service description for PCS. As further shown in FIG. 6, LAP 106 is provided in electrical communication with SDF 122, SCF 120 as well as RACF 126. In turn, LAP 106 is provided in electrical communication with VDT network 108 which comprises IVDS 110, STT 112 and television set 114.

Referring back to FIG. 5, SCP 104 is operative to invoke a Service Logic Program (SLP) and inform the LAP 106 that the location of a mobile station 95 is desired by a VDT caller. The SLP then informs the terminating ISDN/AIN switch to call the mobile unit 95, but suppress transmission of audible ringing signals to the mobile unit 95. SSP 100 is further operative to temporarily suspend call processing and send a call information request signal to SCP 104 via STP 102 so as to invoke the SLP. Standard AIN messages, such as Play_Announcement and collect digits can be utilized to request RF measurement data to be sent over the signalling system to the SLP, and from the SCP 104 to the LAP 106. As explained in further detail herein, these analog and/or TDMA RF measurements may include, for example, Relative Signal Strength Indication uplink ($RSSI_p$), Relative Signal Strength Indication downlink ($RSSI_{down}$), Word Error Rate uplink ($WER_{up}$), Word Error Rate downlink ($WER_{down}$), Quality Indication uplink ($QI_{up}$) Quality Indication downlink ($Q_{down}$), Time Differential uplink ($TD_{up}$), Time Differential downlink ($TD_{down}$), etc. and distance from the base station. Finally, LAP 106 is in electrical communication with the location databank 98 and the control unit 94. The LAP 106 is operative to access the location databank 98 and determine and forward the location of the mobile unit 95 to the control unit 94.

The IP-SCP API can be implemented using any mutually agreed-upon message set, such as Structured Query Language (SQL), which is supported by most vendors. Alternatively, the following messages could be used to define the IP-SCP API:

```
- getData: SCP requests data from the IP (or LAP),
- getDataResult: IP (LAP) sends requested data to the SCP,
- sendData: SCP sends updated data to the IP (LAP),
- sendDataResult: IP (LAP) responds with status of SCP's update request.
getData              OPERATION
PARAMETER            SEQUENCE {
                     serviceKey              ServiceKey,
                     securityIdentifier      SecurityIdentifier OPTIONAL,
                     requestedDataElements   DataElementList
                     }
RESULT               SEQUENCE {
                     resultType              ResultType,
                     dataElementsReturned    DataElementBlock
                     }
ERRORS               {
                     missingCustomerRecord,
                     dataUnavailable,
                     taskRefused,
                     unauthorizedRequest,
                     generalFailure,
                     timerExpired,
                     systemNotResponding,
                     incompatibleVersions,
                     queueFull,
                     resultsTooLong
                     }
::=59137
sendData             OPERATION
PARAMETER            SEQUENCE {
                     serviceKey              ServiceKey,
                     securityIdentifier      SecurityIdentifier OPTIONAL,
                     updateDataElements      DataElementBlock
                     }
RESULT               SEQUENCE {
                     resultType              ResultType,
                     dataElementsUpdated     DataElementBlock
                     }
ERRORS               {
                     missingCustomerRecord,
                     dataUnavailable,
                     unauthorizedRequest,
                     generalFailure,
                     timerExpired,
                     systemNotResponding,
                     incompatibleVersions,
                     queueFull,
                     }
::=59138
generalFailure          ERROR ::= 1
missingCustomerRecord   ERROR ::= 4
dataUnavailable         ERROR ::= 6
taskRefused             ERROR ::= 7
queueFull               ERROR ::= 8
timerExpired            ERROR ::= 10
systemNotResponding     ERROR ::= 15
unauthorizedRequest     ERROR ::= 20
incompatibleVersions    ERROR ::= 60
resultsTooLong          ERROR ::= 61
ServiceKey ::= [10] CHOICE {
   lineNumber [0] IMPLICIT Digits
   -- other types of service keys may be added in the future
}
DataElementList ::= SET OF ElementIdentifier
ResultType ::= [203] IMPLICIT ENUMERATED {
   completeSuccess (0),
   partialSuccess (1),
   complete Failure (2)
}
DataElementBlock ::= SET OF DataElement
DataElement ::= SEQUENCE {
   elementIdentifier ElementIdentifier,
   elementValue ElementValaue
}
ElementIdentifier ::= INTEGER
ElementValue ::= CHOICE {
   elementError [0] IMPLICIT ElementError,
   elementData [1] ElementData
}
ElementError ::= ENUMERATED {
   ee-successfulUpdate       (0),
```

```
                                -continued ee-generalFailure            (1),
ee-missingCustomerRecord     (4),
ee-dataUnavailable           (6),
ee-taskRefused               (7),
ee-timerExpired              (10),
ee-systemNotResponding       (15),
ee-unauthorizedRequest       (20),
}
ElementData ::= CHOICE {
    elemBoolean              [0] IMPLICIT BOOLEAN,
    elemInteger              [1] IMPLICIT INTEGER,
    elemString               [2] IMPLICIT OCTET STRING,
    elemDigits               [3] IMPLICIT Digits,
    elemReal                 [4] IMPLICIT REAL,
    elemAindigits            [5] IMPLICIT AINDigits
    -- possibly other standard types
}
Digits ::= OCTET STRING -- as defined in TR-246
AINDigits ::= OCTET STRING -- as defined in TR-1285
SecurityIdentifier ::= [202] CHOICE {
    pin [0] IMPLICIT Digits
}
END
```

The above I/O definition statements provide an example of a method of specifying the LAP-SCP (or IPSCP) interface using Abstract Syntax Notation 1 to define the get data and send data structure. A similar technique could be used to define the result messages.

The location databank 98 provided in electrical communication with Intelligent Peripheral 106 is operative to store real-time RF measurements for Radio Port 92 and/or a cellular tower 93, including their link budgets. Intelligent Peripheral 106 is, however, operative to access the location databank 98 and determine and forward the location of the PCS or cellular mobile unit 95 to their respective control units, i.e., RPC/MTSC 94/96, at the request of the SLP. As indicated above, in keeping with the invention, and with reference to the Stage 2 service architecture of FIGS. 3a–3b, the SLP can be used to embody the functions of the TMD 60, and/or the TMC 58 and/or PMC 62 and/or PMD 64 and/or RASC 40.

Significantly, the above location information, i.e. the determined location of the mobile unit 95 and the location of the corresponding base station may be forwarded as a text description, video description, data point description or any other suitable informative means. When location information is sent as a video description, a Video Dial Tone (VDT) network 108 is provided which includes an Interactive Video Delivery System (IVDS) 110 and a Set Top Terminal (STT) 112. As shown in FIGS. 5–6, STT 112 is in electrical communication with a video monitor 114.

Location Processing

The system of the present invention requires detailed location processing utilizing scaled contour shapes which are modeled based upon determined analog and/or TDMA RF measurements for each base station. The location processing of the present invention focuses on the ability to predict and model RF contours using actual RF measurements, then performing data reduction techniques such as curve fitting techniques, Bollinger Bands, and Genetic Algorithms, in order to locate a mobile unit 95 and disseminate its location. An example of a suitable software analysis tool is a program by Axcelis, Inc. termed "Evolver 2.0". This is a data optimization spreadsheet program that can perform a genetic algorithm optimization of the parameters generated in the above curve fitting techniques.

Figure 7:
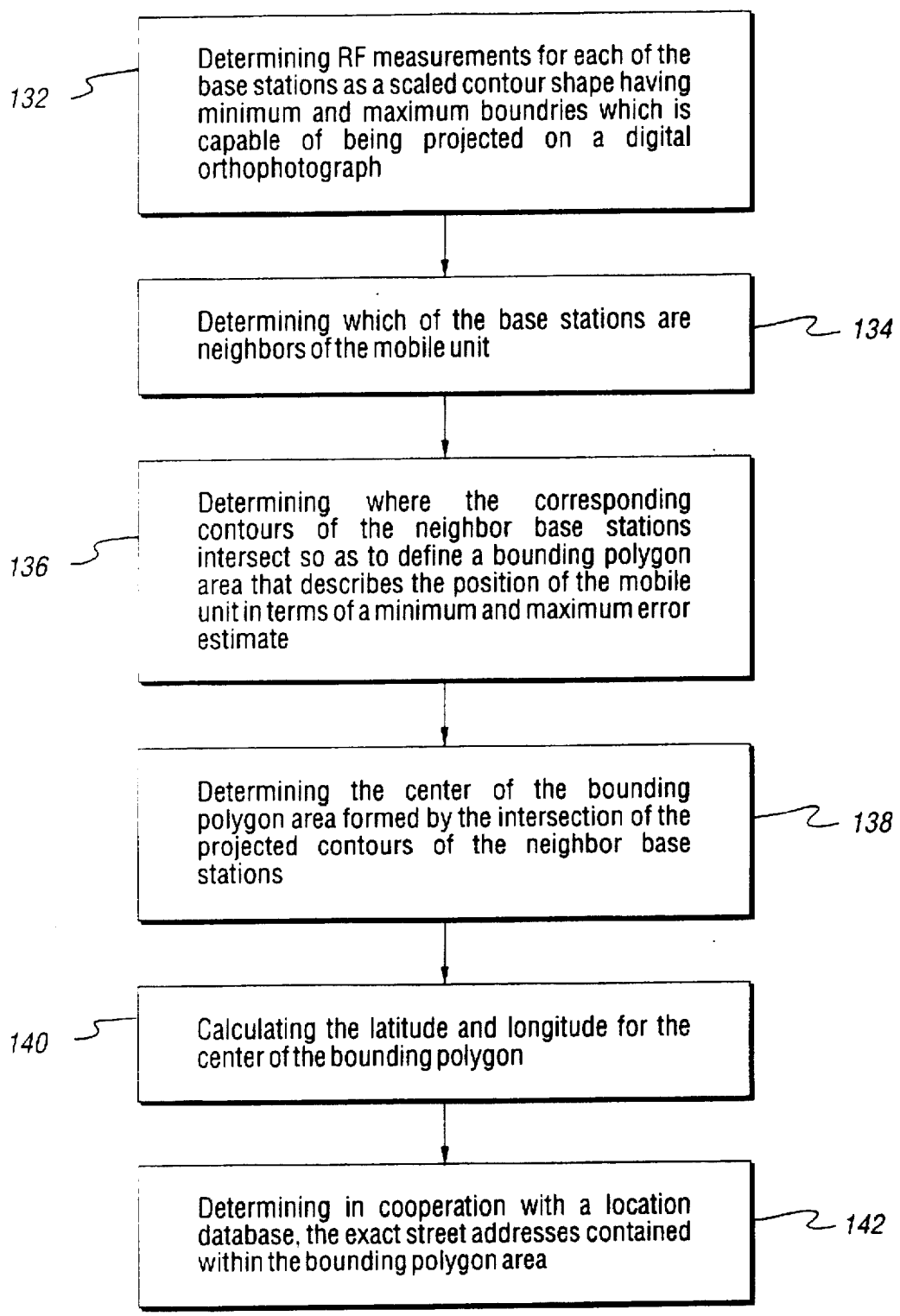
FIG. 7 is a generalized block diagram of the location method of the present invention.

More specifically, and with reference to FIG. 7 of the drawings, the method steps include modeling 132 determined RF measurements for each of the base stations as a scaled contour shape having minimum and maximum boundaries which is capable of being projected on a mapping system such as an orthophotograph which may be digitally recorded. Thereafter, it must be determined 134 which of the base stations can be "heard" by the mobile unit 95, i.e., which base stations are neighbors of the mobile unit. Once this information is known, it may further be determined 136 where the corresponding contours of the neighbor base stations intersect so as to define a bounding polygon area that describes the position of the mobile unit 95 in terms of a minimum and maximum error estimate.

Once the above information is known, the center of the bounding polygon area formed by the intersection of the projected contours of the neighbor base stations may further be determined 138. From this information, the latitude and longitude for this center may be calculated 140 and there may be further determined 142 in cooperation with a location databank, the exact street addresses contained within the bounding polygon area.

As readily seen, a key component of the present invention is the ability to diagram and model the RF propagation loss from a given Base Station/Radio Port, for various analog and/or TDMA RF measurement arc segments, which will define entire contours. As those skilled in the art will recognize, in theory, if the "free space" power loss is known for all useful distances in all directions from a base station, then individual circular power loss contour shapes may be drawn around the base station. Assuming two or preferably three base stations are neighbors of the mobile unit 95, then analog and/or TDMA RF measurements may be used to determine location via intersecting contours. The particular shape of the contour intersections is the bounding polygon that describes the location, in terms of the maximum error estimate.

Unfortunately, the principle of free space loss rarely exists when attempting to predict base station coverage areas since the surrounding buildings, trees, traffic signs and other geographical "clutter" blocks transmitted signals. To account for these variables involved in propagation prediction, the present invention therefore utilizes a number of segmented models and analysis techniques for data reduction purposes. The resulting output becomes the location databank which consists of a collection of component databases, many of which may be designed on a per base station basis. The component databases may include a base station database, a prediction database, a measured analog and/or TDMA RF database, a generic curve fit database, a Bollinger band database, equipment-specific corrections database, and a run-time database as described in further detail below.

Base Station Database

In keeping with the invention, the base station database provides a detailed list of the attributes of every installed and proposed base station. Applicants contemplate that this database would contain the following data elements:

1. Name or identification of base station.
2. Base station vendor name, model number, serial number.
3. Latitude (LAT), Longitude (LONG), or at least accurate street location detail for conversion to/from LAT and LONG, and Altitude (ALT) of physical placement of base station.
4. Base station transmitter default power, for each active transmission channel, and power range.
5. Antenna gain contours (if omni-directional, otherwise sector make-up, and gains within each sector).
6. Whether or not a distributed antenna scheme is used, and if so, placement (LAT, LONG, ALT) of all remote antennas.
7. Nearby surrounding obstructions (e.g., the mounting surface of the RP: is it on a metal wall, in an elevator, or hanging in free space).
8. Base station transmitter operating frequency band (licensed, unlicensed), and allowed frequencies.
9. Whether or not a duplicated transmitter is used, and if so, include the identifying characteristics of each transmitter.
10. The PSAP associated with each base station.
11. Type of air interface: protocol and signaling (e.g., PACS, GSM, DECT, PHS-PHP, IS-54, etc.) This information should be derived from the base station vendor name, model number, and serial number. Any dual or multi-mode capabilities must also be known and characterized.
12. Base station antenna gain contour. This information could be derivable from knowledge about the antenna's characteristics and surrounding obstructions.
13. The control unit associated with the base station, neighboring communication network topology and the associated central office. This information may be derived from knowledge of the control unit and its connected central office at the time the wireless communication system is originally engineered. Nonetheless, the network topology may change, due to a variety of reasons. For example, future base stations may use a signaling protocol arrangement with their control unit such that the base station can be easily moved around without prior notification to a centralized work manager system. A control unit may automatically discover the addition/deletion or in/out change of a particular base station. To the extent this automatic capability exists, a forwarding event report message must be sent to a system associated with the location service. In cases where the control unit is associated with a PBX, foreign exchange circuit, or similar remoting facility, the identification and end-to-end topology circuit arrangements will be needed.
14. Frequency Assignment Characterization (FAC). This should be derivable from the RP vendor, make/model information. If the FAC is automatic, then a potential incompatibility may exist during the performance of the location function. Knowing these details, and/or having the ability to control the occurrences of frequency assignment, can resolve incompatibilities.
15. Current operational RP status. This information should be derivable from the wireless communication network OAM&P systems that should routinely receive current information about the in-service state of the base stations. This information is needed, for example, because a planned, but not in-service base station, or a faulty base station, could disturb the location algorithm, if this information is otherwise not known.
16. Traffic load characteristics of the base station and its superior network. This may be derivable from the network planning activity, base station model characteristics, and dynamic monitoring by OAM&P systems, or each base station. For example, if a base station needed to perform an emergency location function, it cannot be invoked because it is at 100% of capacity, with no possibility to shed "non-emergency" load, then other techniques may be applied.

Prediction Database

This is a planning database primarily populated by, and used to support/interact with base station site planners and installation engineers. In accordance with the invention, it is used primarily to predict coverage. The location function accesses this database in order to require a rudimentary understanding of intended coverage area of newly planned cell sites and their operational status. Using the various RF propagation models and special plane curves, propagation coverage will be predicted for all base stations by examining the placement of the base station, local street widths, and the surrounding clutter. This provides a quick, inexpensive estimate of each base station's coverage.

Measured RF Database

In keeping with the invention, the measured analog and/or TDMA RF database consists of actual measurements taken from the area surrounding the base station. These measurements could be taken by technicians during base station site installation or any other collection technique. Both uplink (mobile station 95 to base station 95) and downlink (base station to mobile station) measurements will be made for data such as Received Signal Strength Indicator (RSSI), Word Error Rate (WER), Quality Indicator (QI), and Time Differential. Each of these variables are known to those skilled in the art and will therefore not be discussed in further detail. These measurements will be recorded along with the exact location at which the measurements were taken. All measurements are made within an arc segment region as discussed in further detail below.

Generic Curve Fit Database

This database is contemplated for use in accordance with the invention when no equipment-specific data is required/available. The generic curve fit database is created in the following manner:

1. Using the measurements database, load the data for each measurement type (i.e. $RSSI_{down}$), per an arc segment region, and per a base station, into a curve fitting program. One such program known to applicants is Table Curve 2D distributed by Jandel Scientific Software. Using any random or pseudo-random method, "holdback" 15% of the data points from the curve-fitting exercise, to be used as verification points later. This process will produce an equation for each measurement type, per region.
2. Inspect the resulting graphs for each measurement. Measurements that produce smooth, well-fit curves will be noted.

3. Simultaneously inspect all graphs for a given region. If one measurement produces a much smoother graph than the others, determining location in that region will require only one parameter. Alternatively, there may be areas within the region that correlate well with some measurements and poorly with others. As shown in FIG. 8, for example, it can be seen that the correlation in area A is fairly good for WER and poor for RSSI. Similarly, the correlation in area B is good for RSSI and poor for WER. These graphs suggest that determining location will require multiple parameters. In the example of FIG. 8, WER would be used in areas A and D, RSSI would be used in area B, and another measurement would be used in area C.

4. Test the equations by using the data points that were excluded from step 1. If the results are satisfactory, go on to the next step. If the error-bounds are too large using the existing equations, it may be necessary to use genetic algorithms to enhance the predictive technique for the region. Genetic algorithms could be used here to simultaneously combine the six (or more) equations in every conceivable manner to produce the best fit.

5. Store the equations for each region in the location database for use during a location request, along with the error estimate.

By analyzing the surrounding characteristics for each model region (i.e. street width, distance from base station to nearest building, etc.) along with a corresponding location equation, it may be possible to re-use this information in a predictive manner for future base station installations. Applicants contemplate that this could reduce costly manual RF measurement testing.

Bollinger Bands

As known to those skilled in the art, the basic idea behind Bollinger Bands is to read data points and create a moving average and a moving standard deviation. The bands are determined by calculating the average of a certain number of data points plus and minus two times the standard deviation of the data. A "sliding window" is used for the volatility of the data. The optimal window size will vary with the condition of the data.

As shown in FIG. 9, Bollinger Bands provide: (1) the ability to handle discontinuities and vast multi-model, noisy search spaces; and (2) they optimize error wherever possible, i.e., wherever field measurements have a low volatility, then Bollinger Bands will generally have a low bandwidth, which results in a more accurate bounding polygon.

In accordance with the present invention and as explained in further detail below analog and/or TDMa, RF measurements will be analyzed using the Bollinger band technique in the following manner:

1. Load the data for each measurement type (e.g. RSSI downlink), per arc segment region, into a program to calculate the sliding window average and standard deviation.

2. For each distinct measurement value (e.g. –70 dB, –71 dB, –72dB, etc.), store the measurement value and the corresponding average distance (in feet) in both the upper and lower band (in feet), based on the sliding window.

Equipment-Specific Corrections Database

This database is contemplated for use with the present invention if vendor-specific, and/or model-specific equipment characteristics are available and are used in the areas of interest, which deviate from the generic curve fit database assumptions. For example, in GSM, different vendors use slightly different mapping or transfer functions, in relating true Word Error Rate, with the vendor's quantized indicator. It is anticipated that public, open standards will be defined, which will mitigate the need for the Equipment-Specific Corrections Database. Data for this database would normally be provided from lab tests performed by mobile unit manufacturers, which are then used for correction purposes with respect to the generic curve fit database, and its assumed internal baseline standard.

Run-Time Database

This database is contemplated by Applicants to be stored directly in the format of the GIS software being used (e.g. map info or ARC/info). It is derived from the data reduction processes, for example, the curve-fitting in Bollinger Bands. Each arc segment per base station contains a number of entries. The first entry defines the independent variables used to calculate location within this arc segment. There is also one entry for each distinct measurement value of the independent variables selected (e.g. RSSI down=–70 dB, –71 dB, –72 dB, etc.) . These entries are actually graphical objects (bounding polygons) that are selectable by the GIS software.

Figure 10:
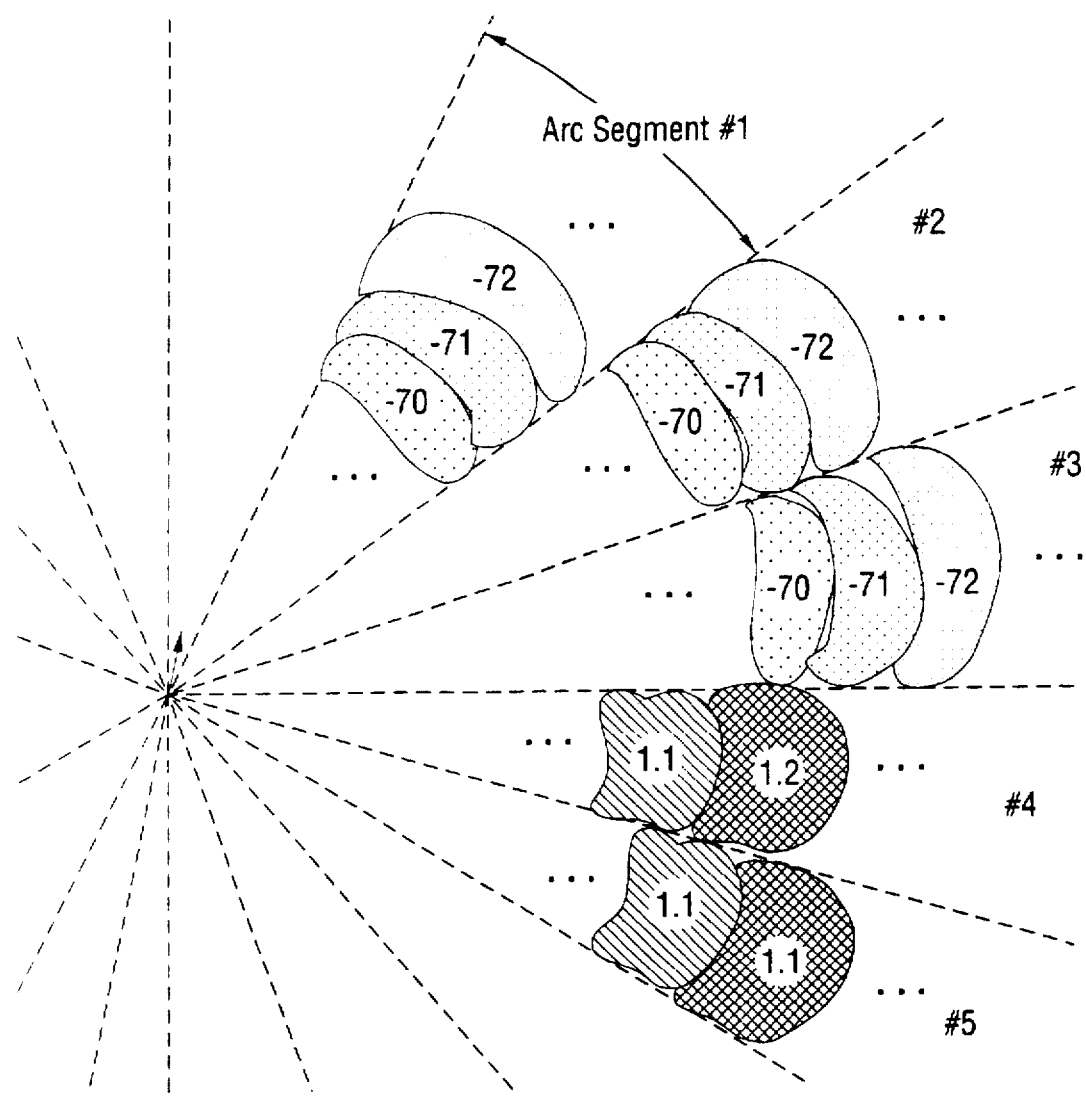
FIG. 10 is a data regression diagram of representative bounding polygons obtained by using a run-time database in accordance with the present invention.

For example, with reference to FIG. 10 and the table below, assume the curve fitting in Bollinger Band analysis for base station 1 has determined that $RSSI_{up}$ is the best location predictor for arc segments 1, 2 and 3, while $WER_{down}$ is the best predictor for arc segments 4 and 5. The run-time database would contain the following entries:

| RUN-TIME DATABASE | |
| --- | --- |
| Arc Segment | Predictor Variable |
| 1 | $RSSI_{up}$ |
| 2 | $RSSI_{up}$ |
| 3 | $RSSI_{up}$ |
| 4 | $WER_{down}$ |
| 5 | $WER_{down}$ |

In addition, the database would contain many bounding polygons per arc segment. FIG. 10 illustrates this concept for the five arc segments mentioned. In this Figure, the bounding polygons for $RSS_{up}$ values of –70 dB, –71 dB, and –72 dB are displayed for arc segments 1–3. Additionally, the bounding polygons for WER down values of 1.1% and 1.2% are displayed for arc segments 4 and 5. While only 2–3 bounding polygons per arc segment are displayed in the Figure, there would actually be many polygons to cover the entire range for variable being used.

The run-time database is displayed with one predictor variable per arc segment as shown above. The Position Location System (PLS) process will actually use more than one predictor variable per arc when a single variable does not reliably predict distance. The runtime database for each arc segment will be constructed by using the results of the curve fit and Bollinger band databases, and will actually consist of two tables. The first table will be used to construct a set of fuzzy logic rules, while the second table will provide a predicted distance value, along with a minimum and maximum boundary.

For example, if arc segment 1 of radio port 5 is predicted well by $RSSI_{down}$, for values of –40 dB to –70 dB, and $WER_{down}$ for values of 1% to 3%, the following entries would appear in the run-time database rule table:

TABLE 1

Run-Time Database Rule Table

| Radio Port | Arc Segment | Variable | Min Range | Max Range |
|---|---|---|---|---|
| 5 | 1 | $RSSI_{down}$ | −40 | −70 |
| 5 | 1 | $WER_{down}$ | 1.0 | 3.0 |

The second table for arc segment one would contain entries such as these:

TABLE 2

Run-Time Database Values Table

| Radio Port | Arc Segment | Variable | Value | Mean Dist | Min Dist | Max Dist |
|---|---|---|---|---|---|---|
| 5 | 1 | $RSSI_{down}$ | −40 | 100 | 0 | 200 |
| 5 | 1 | $RSSI_{down}$ | −41 | 120 | 20 | 220 |
| 5 | 1 | $RSSI_{down}$ | ... | ... | ... | ... |
| 5 | 1 | $RSSI_{down}$ | −70 | 500 | 400 | 600 |
| 5 | 1 | $WER_{down}$ | 1.0 | 400 | 350 | 450 |
| 5 | 1 | $WER_{down}$ | 1.1 | 440 | 390 | 490 |
| 5 | 1 | $WER_{down}$ | ... | ... | ... | ... |
| 5 | 1 | $WER_{down}$ | 3.0 | 800 | 700 | 900 |

During a location request, the LAP would access the run-time database rules table and construct the following code to determine the caller's predicted distance from radio port 5 for arc segment 1:

Pseudo-code:

```
rule_1 = FALSE
rule_2 = FALSE
/* look for active rules */
   if −70 <= RSSI_down <= −40 then
      rule_1 = TRUE
   if 1.0 <= WER_down <= 3.0 then
      rule_2 = TRUE
   if rule _1 is TRUE and rule_2 is TRUE
      /* both rules apply, so we have to perform a weighted average using
      the difference between predicted max and min */
      weight_1 = (RSSI_down_max−RSSI_down_min)/
         (RSSI_down_max−RSSI_down_min+WER_down_max−WER_down_mean)
      weight_2 = (WER_down_max−WER_down_min)/
         (RSSI_down_max−RSSI_down_min+WER_down_max−WER_down_mean)
      /* reverse the weights because the one with the smaller difference
      is better and should be weighted more heavily */
      mean = weight_1*WER_down_mean + weight_2*RSSI_down_mean
      min  = weight_1*WER_down_min  + weight_2*RSSI_down_min
      max  = weight_1*WER_down_max  + weight_2*RSSI_down_max
   else if rule_1 is TRUE
      use RSSI_down mean, min and max
   else
      use WER_down mean, min and max
```

Figure 11:
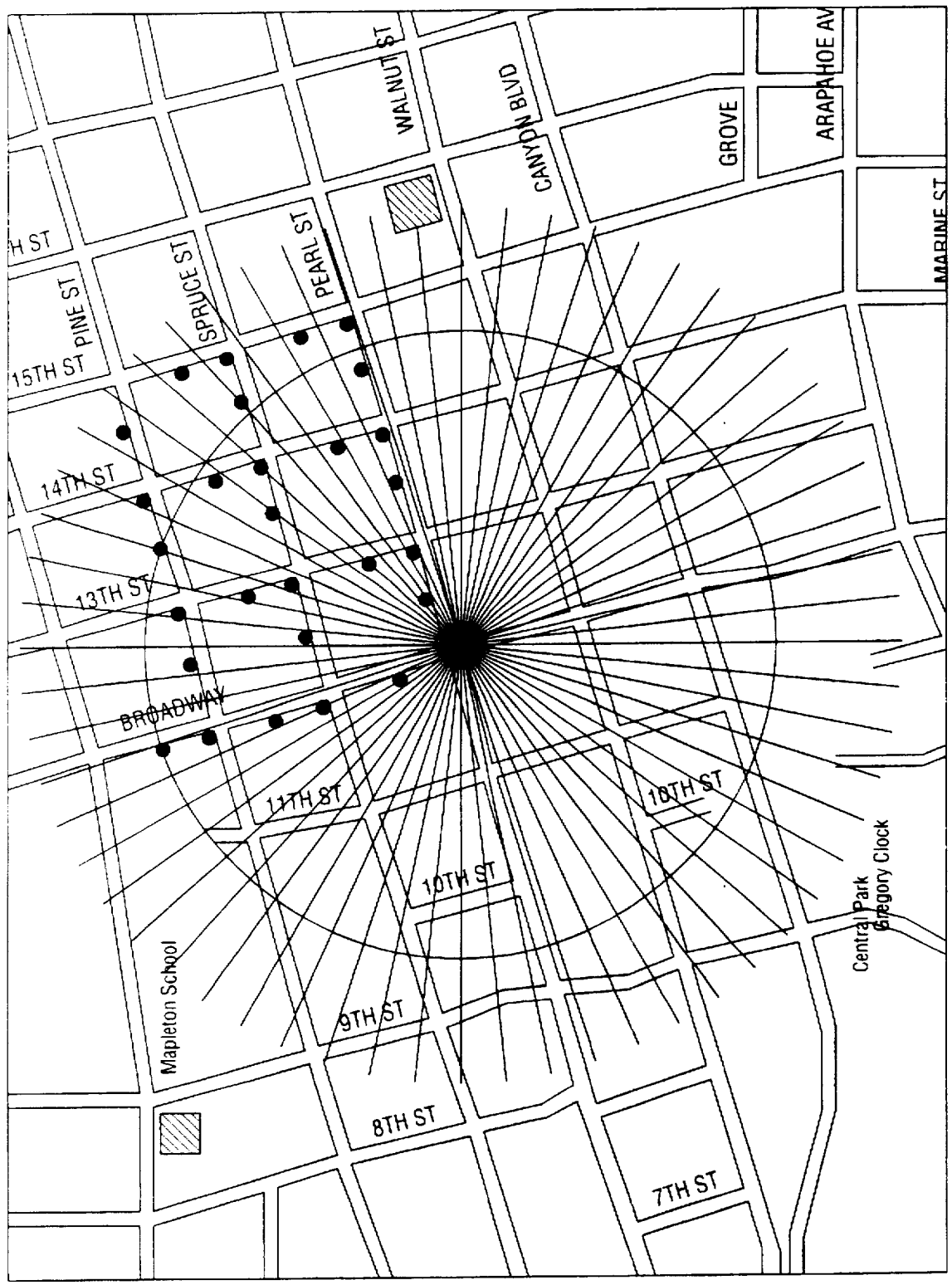
FIG. 11 is a data regression diagram of representative arc segments drawn around a radio port.

The detailed steps of preparing the run-time database and thus the PCS location databank may be illustrated with reference to FIG. 11 of the drawings. FIG. 11 is a schematic diagram of a Radio Port that has arc-segments 144 of 6 degrees. The arc-segments create discrete sections of the area around the Radio Port. With these sections clearly defined, the RF behavior of the Radio Port can be characterized in each section independently. After the locations have been partitioned into arc-segments, a spreadsheet file can be produced for each arc-segment.

The preparation steps include the initial gathering of field data. The desired parameters ($RSSI_{up}$, $RSSI_{down}$, $WER_{up}$, $WER_{down}$, $QI_{up}$, $Q_{down}$, etc.) will be collected at locations surrounding the Radio Ports. In a preferred embodiment, these locations will be approximately 10 meters apart from one another. All measurements will be placed with location tags in a suitable spreadsheet file such as, for example, Microsoft Excel.

The locations will thereafter be partitioned into arc segments 144 as indicated above. In keeping with the invention, the locations need to be partitioned into arc segments 144 in order to accurately model the parameters around corresponding Radio Ports. After the data has been collected and partitioned into arc segments, a suitable curve fitting program such as TableCurve 2D will be used to curve-fit the data (distance versus each parameter) for each individual arc-segment. The software generates a list of functions that could possibly characterize the data and sorts the functions (best to worse) by means of lowest Fit Standard Error (FitStdErr).

Sometimes, the best fit (lowest FitStdErr) that the curve-fitting software packages produces is not the best fit for the RF data in terms of correlating with distance. There are many different examples of the software package fitting a curve to the data that is not physical (not possible in the RF environment). Some examples of non-physical fits are fits that swing into negative distances, fits that have high sinusoidal content, and fits that have many slope reversals or large swings in areas where few or no actual data points reside.

FIG. 12 illustrates two TableCurve 2D curvefit on the same data. The plot on the left shows the curve-fit that the software package chose as the best fit (it is the fit with the lowest FitStdErr). One skilled in the art would recognize that the plot on the left is highly unlikely to be representative of the data because of the large swings where few data points lie. With the data from FIG. 12, a manual search for the most logical fit is needed. One skilled in the art would therefore search the fits until she found a fit that is more logical (like the fit on the right in FIG. 12).

FIG. 13 provides another example of a TableCurve 2D fit that is not logical. The fit on the left has one swing to a very large distance (off of the top of the plot) in an area where there are no data points. The plot on the right is much more likely to describe the data accurately in the area where there are no data points, even though it has a higher FitStdErr than the plot on the left.

FIG. 14 illustrates yet another fit (left) that has a large negative distance swing (again, where no data points lie) and a sharp, large positive distance swing. In keeping with the invention, negative distances are not valid because they do not represent the RF environment properly. The sharp, large distance swing is not reliable because of the low number of data points in the area. The plot on the right has a much higher probability of being accurate.

The lowest FitStdErr fit in FIG. 15 displays a more subtle problem. The points along the distance axis (vertical) are not well represented, yet they make up the majority of the data point population. The plot on the right better represents those data and also eliminates questionable swings that are in the left plot.

Although manually searching for the most logical fit may result in a larger FitStdErr, the fit will also be more representative of the actual RF environment. The number of invalid fits by TableCurve 2D, for example, can be minimized by collecting a high number (50–60) of evenly spaced data points within each arc-segment.

Figure 16:
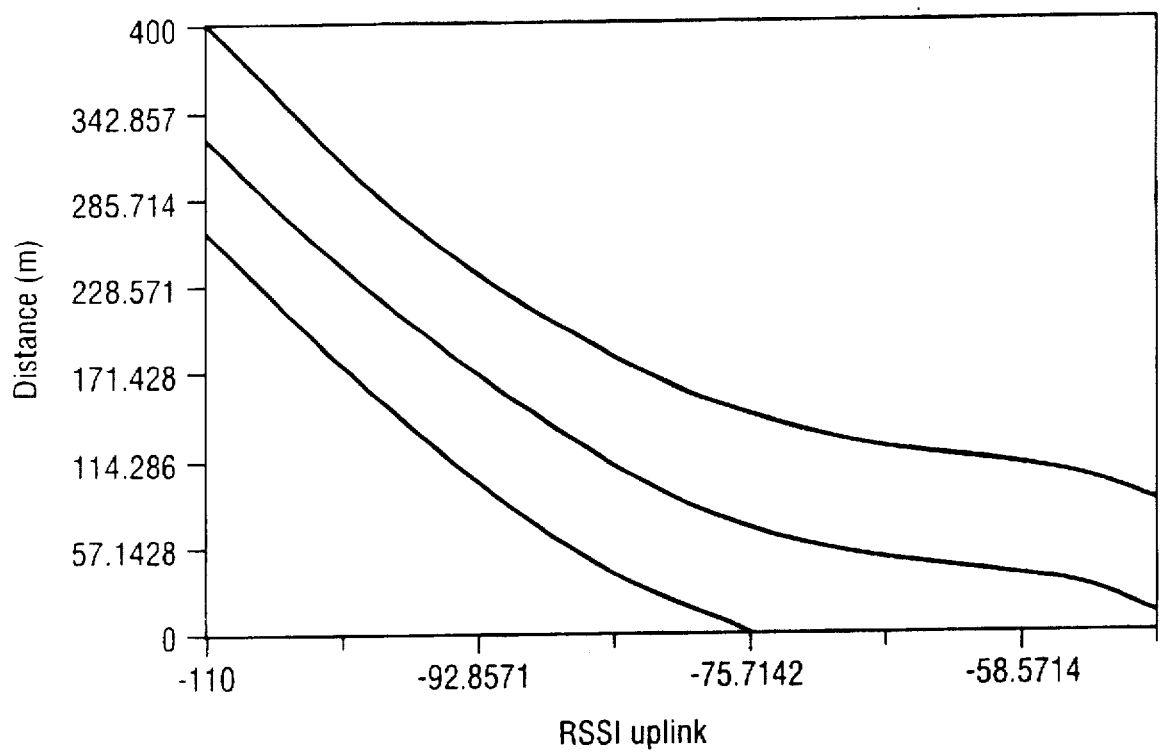
FIG. 16 is a data regression diagram of a best fit confidence interval with maximum and minimum bands.

After the curve fitting program produces a valid fit, 95% confidence intervals (or bands) can be created. These bands (minimum and maximum) are produced by adding and subtracting twice the FitStdErr to the average fit. Any negative distances will be eliminated from the band. FIG. 16 shows a best fit with maximum and minimum confidence bands. It should be noted that through simple numeric integration, the area of the interval can be computed. The area of the band will describe how volatile the data is throughout a complete arc-segment.

Figure 17:
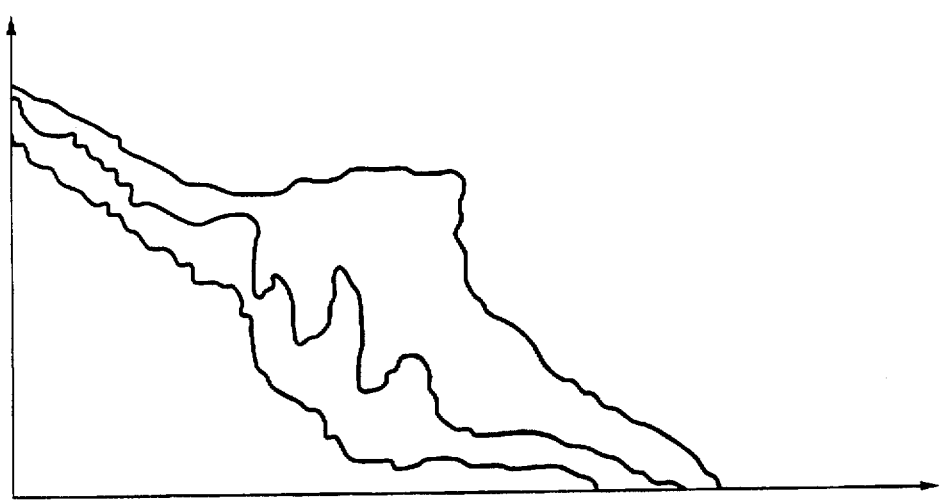
FIG. 17 is a data regression diagram of a representative Bollinger band.

After the confidence intervals have been determined, Bollinger bands can be created for the data in each arc-segment 144. As indicated above. Bollinger bands are similar to the confidence intervals in that they represent a range in which data points are likely to reside. However, Bollinger bands widen according to the volatility of the data in a certain area of a particular arc-segment. Basically, the Bollinger interval is wide in areas where the deviation of the data points is large, and is narrow in areas where the deviation of the data points is small. FIG. 17 shows how Bollinger bands widen in areas of data volatility.

As discussed above, Bollinger bands use a "sliding window" technique to compute a moving average across a data set. The sliding window size for location purposes will be 20% of the data population for each arc-segment. As with confidence intervals, the area of the Bollinger bands can be computed through simple numeric integration. The advantage of the Bollinger band over the confidence interval is that the area of the Bollinger band in a discrete section of an arc-segment can describe the volatility of the data in that section. The area of the confidence interval can only describe the volatility of the data throughout a complete arc-segment.

A problem with Bollinger bands is that they have a phase lag that is introduced in calculating the moving average. Because of this phase lag, the Bollinger band widens slightly beyond the volatile data. The amount of phase lag is dependent on the size of the sliding window.

Figure 18:
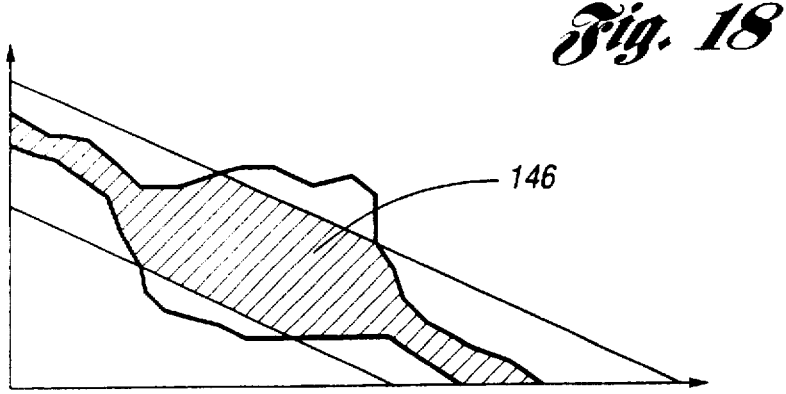
FIG. 18 is a data regression diagram of a location band.

To "clip" the phase lag, the Bollinger band and confidence intervals can be intersected. The intersection of these two bands becomes the location or distance band 146, as shown in FIG. 18. The location band 146 is what will be used to generate (for the location databank) minimum and maximum distances for any valid values of any of the parameters. The area of the location band 146 can be computed with simple numeric integration and is an indication of the data volatility.

At this stage, location bands have been produced for all parameters in each arc-segment. Now, a method of determining which parameters to use is needed. Fuzzy logic will be used to determine which parameters will be used when estimating a distance. Fuzzy logic, as known to those skilled in the art, consists of fuzzy patches or rules which try to explain the behavior of fuzzy systems. Fuzzy patches or rules are simply "if-then-else" statements that describe a discrete section of the system's output. The goal is to have a group of fuzzy patches that accurately describe the system's complete output. In this location system, fuzzy rules will be created to use the parameters with the least volatility to estimate a distance.

Figure 19:
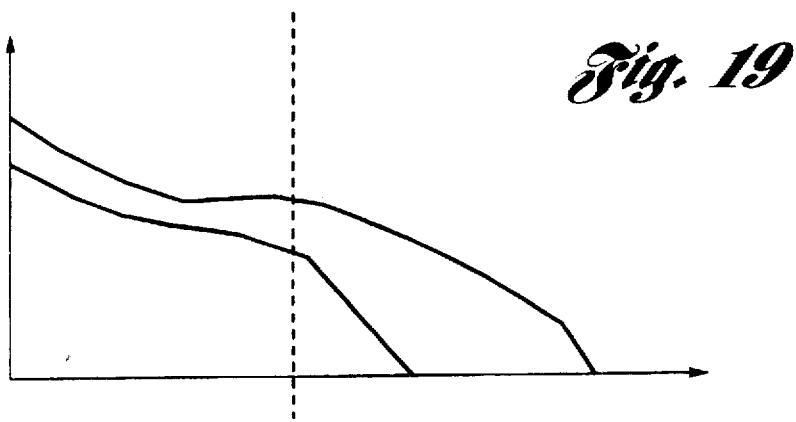
FIGS. 19–20 provide representative data regression diagrams of $RSSI_{down}$ and $WER_{up}$.
Figure 20:
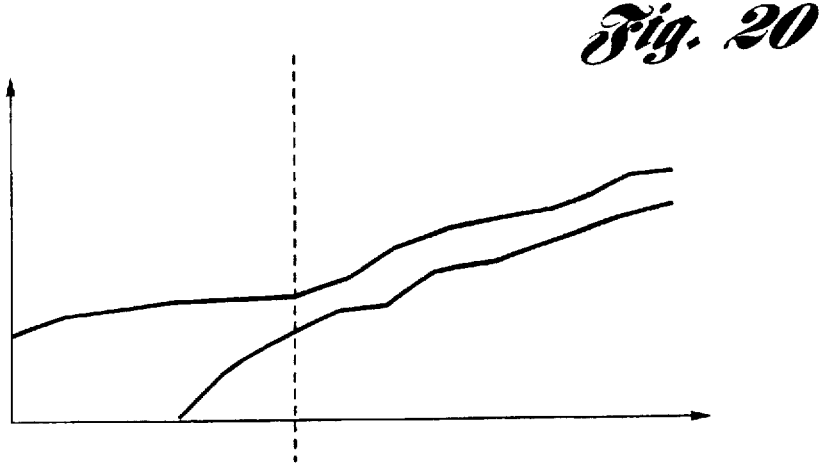

FIGS. 19 and 20 provide examples of two different parameters from the same arc-segment. An example of a fuzzy rule would be as follows: If $RSSI_{downlink}$ reading lies in the range to the left of the dashed line, use $RSSI_{down}$. Otherwise, use $WER_{up}$.

The above fuzzy rule is an over-simplified case, yet it illustrates the idea behind fuzzy logic. With all parameters being used, weighted averaging can be used to implement a combination of parameters in the fuzzy model. Fuzzy logic is flexible in allowing different parameters to carry different weights. In the location system of the present invention, the weights for the fuzzy logic averaging will be determined by the volatility of the data (used the measure of the location band area). In the "gray" areas of overlapping fuzzy rules, the overlapping rules are added together (with associated weights) and then the average of the curve will be used.

By preparing several individual parameter bands to get the smallest volatility within a "quantization", the best solution may be determined. Finally, the final solution may be compiled using fuzzy logic technique values. For example, in the pseudo code above, each of the database entries is weighted against one another such that the database entry of minimum volatility having the strongest predictor of distance at a particular location for particular values is obtained where more than one rule applies.

As known to those skilled in the art, fuzzy logic is a process where, unlike neural networks, more than one rule applies. The rules are averages in a predetermined weighting scheme. Unlike normal fuzzy logic rules, however, the weighting here pertains to minimum and maximum values. In keeping with the invention, volatility is used as an indicator of the best weight. The variable with the least volatility is weighted the most, however, other variables are not discounted.

In this manner, overlapping RF measurements may be utilized. Thus, 80% of WER and 20% of RSSI might be used in predicting location. The system and method of the present invention averages the minimum distances as well as the maximum distances which then become the min and max boundaries for each arc segment. This process is repeated for all other arc segments which permit a min and max bounding polygon to be drawn around a Radio Port. The process is thereafter repeated for neighboring Radio Ports as they are "heard" to determine the most accurate predicted bounding contours for the other neighboring Radio Ports. The resulting contours (i.e. the minimum and maximum contours) are thereafter drawn around each Radio Port, the intersections of which define the bounding polygon where the mobile unit 95 can be located.

Because the Radio Port data is partitioned into separate arc-segments and then analyzed, there will be discrete jumps in the data between arc-segments. To improve the continuity of the data between arc-segments, a line will be added to help smooth the jumps. The slope of this line will roughly be the magnitude of the jump divided by some $\Delta X$ (where $\Delta X$ is 10–20% of the width of the arc-segment).

In keeping with the invention, and by reference to FIG. 21 of the drawings, the step of modeling the determined analog and/or TDMA RF measurements as scaled contour shapes therefore requires segmenting 148 the coverage areas of each of the base stations into a plurality of arc segments designated by reference numeral 144 in FIG. 11. For each of the arc segments 144, a plurality of single or multiple regressions must be performed 150 so as to convert actual data into a corresponding plurality of mathematical curve-fit equations each representing a relationship between a predetermined measurable variable, i.e. RSSI, WER, etc. and distance from the base station. For each of the arc segments, the degree of fit must be determined 152 of the corresponding mathematical equation by comparing each of the mathematical equations with actual data. The mathematical equations may thereafter be optimized 154 by determining which has the best correlation and least standard error for a predetermined portion of each arc segment 144.

In an alternative embodiment, a Genetic Algorithm (GA) may be used to optimize the parameters of each of the single or multiple regressions so as to further improve the degree of fit for greater correlation and minimum standard error.

Still further, in cases where there is generally poor correlation between all of the mathematical equations of an arc segment and the actual data, the corresponding base station may be instructed along with the receiver, i.e., the mobile unit 95, to each temporarily change their transmission frequencies by 10–40 MHz. Thereafter, additional analog and/ or TDMA RF measurements may be obtained for the base station at the changed frequency, including its link budget, for the same predetermined plurality of distances and directions. As readily seen, this will increase the number of variables for consideration and analysis.

The optimized mathematical equations for each arc segment are thereafter combined 156 so as to form the scaled contours 158 such as that shown in the schematic of FIG. 22.

Each scaled contour 158 has minimum and maximum bounds 160 and 162. After these boundaries have been determined for an entire base station, minimum/maximum boundaries also define minimum/maximum contours, based on a given set of real-time measurements in both the uplink and downlink directions. This process is repeated for neighboring base stations, and the resulting intersection (if any) then define a min/max bounding polygon 164.

The polygon is then projected onto a mapping system such as, for example, an orthophotograph which may be digitally recorded, or similar means, with nearby street names as shown, for example, in FIG. 23. In a preferred embodiment, the entire picture may then be sent via an IVDS circuit to a PC or workstation-based video collaboration system (or similar two-way video system). When used in emergency situations, the video collaboration system would be located in the nearest PSAP. As shown in FIG. 23, the location processing steps of the present invention may be used to locate a "victim" determined to be about midway along Maple Street, as it intersects with Elm Street. Because the bulk of the bounding polygon 164 is along the North side of Maple Street, from an intuitive perspective, the "victim" is more likely to be on the North side of Maple Street.

In keeping with the invention, it should be noted that even in the degenerate case where only one base station's signal can be detected by the mobile unit 95, min/max bounding bands around the base station, also projected on a high quality digital orthophotograph, can provide superior information to the emergency call taker and the PSAP as opposed to merely providing the base station generic coverage area, as a circle. For example, FIG. 24 shows that based on the analog and/or TDMA RF measurements received, the "victim" cannot be at the same intersection as the base station itself, but rather elsewhere as shown. From a quick inspection of the bounding polygon, it is apparent that there is a strong possibility the "victim" is in Building 3 and less likely that the "victim" is in Building 2, or in the neighborhood park. This type of information, although unusual, could be used by search teams to be most efficient and fast in their task of actually finding the "victim" in accordance with the present invention even though only a very minimum amount of analog and/or TDMA RF measurement data was available in real-time during the call.

Nonetheless, it should be noted that from a location accuracy and efficiency point, the above-described Interactive Video Delivery System (IVDS) approach which requires sending bounding polygon location via video, is contemplated to provide the user with the most accurate location details.

While the best mode for carrying out the invention has been described in detail, those familiar with the art to which this invention relates will recognize various alternative designs and embodiments for practicing the invention as defined by the following claims.

What is claimed is:

1. For use in a wireless communication system having at least one Registration Area (RA), the RA including at least one control unit and at least one base station having a corresponding coverage area, a method for determining and reporting the position of a mobile station to a third party via a Video Dial Tone (VDT) network, the method comprising:

for each of the base stations in the at least one RA, determining in cooperation with a mobile station receiver, a plurality of analog and/or TDMA Radio Frequency (RF) measurements for the base station, including its link budget, for a predetermined plurality of distances and directions;

for each of the base stations, modeling its determined analog and/or TDMA RF measurements as a scaled contour shape having minimum and maximum boundaries which is capable of being projected on a digital orthophotograph;

generating a VDT call to the mobile station, the VDT call including an alert message which is modified to suppress ringing of the called mobile station;

determining RF measurements from neighboring base stations of the called mobile station;

determining where the corresponding contours of the analog and/or TDMA RF measurements from neighboring base stations intersect so as to define a bounding polygon area that describes the position of the mobile station in terms of a minimum and maximum error estimate; and overlaying the bounding polygon area on a digital orthophotograph to form a location picture and transmitting the location picture to the VDT caller in digital form for display on a video terminal.

2. The method of claim 1, wherein the VDT network comprises:

an Interactive Video Delivery System (IVDS); and a Set Top Terminal (STT) in electrical communication with the IVDS and the video terminal.

3. The method of claim 2, wherein the wireless communication system includes a Service Control Point (SCP) in electrical communication with the mobile unit, the SCP operative to store information regarding the current RA of the mobile unit and the ID's of all corresponding control units and base stations.

4. A positioning system, comprising:

a wireless communication system having at least one Registration Area (RA), the RA including at least one control unit, and at least one base station operative to forward and receive calls to and from at least one mobile unit within a corresponding coverage area over air interface channels;

a Video Dial Tone (VDT) network including an Interactive Video Delivery System (IVDS) and a Set Top Terminal (STT), the STT in electrical communication with a video monitor;

a location databank operative to store realtime analog and/or TDMA RF measurements for the at least one base station, including its link budget; and a Location Adjunct Processor (LAP) in electrical communication with the location databank, the control unit, and the VDT network, the LAP operative to access the location databank and through a Service Logic Program (SLP) determine and forward the location of the mobile unit to the video monitor via the VDT network.

5. A positioning system as in claim 4, wherein the wireless communication system further comprises:

a terminating ISDN/AIN switch;

a Service Transfer Point (STP);

a Service Control Point (SCP) in electrical communication with the STP, the SCP operative to determine the current RA of a selected mobile unit and generate alert messages to all corresponding control units and base stations within the RA at the request of the VDT caller; and a Service Switching Point (SSP) in electrical communication with the control unit and the STP, the SSP operative to temporarily suspend call processing and send a call information request signal to the SCP via the STP so as to invoke the SLP and inform the LAP that the location of a mobile unit is desired by the VDT caller, whereby the SLP further informs the terminating ISDN/AIN switch to suppress transmission of audible ringing signals to the mobile unit.

* * * * *